(12) United States Patent
Murakami et al.

(10) Patent No.: US 7,180,831 B2
(45) Date of Patent: Feb. 20, 2007

(54) MAGNETO-OPTICAL RECORDING MEDIUM HAVING A RECORDING LAYER OF COLUMNAR STRUCTURE

(75) Inventors: Motoyoshi Murakami, Hirakata (JP); Takeshi Sakaguchi, Ibaraki (JP); Masahiro Birukawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/497,273

(22) PCT Filed: Nov. 25, 2002

(86) PCT No.: PCT/JP02/12289

§ 371 (c)(1),
(2), (4) Date: Nov. 10, 2004

(87) PCT Pub. No.: WO03/046905
PCT Pub. Date: Jun. 5, 2003

(65) Prior Publication Data
US 2005/0086679 A1 Apr. 21, 2005

(30) Foreign Application Priority Data
Nov. 29, 2001 (JP) .............................. 2001-365047

(51) Int. Cl.
*G11B 11/00* (2006.01)
(52) U.S. Cl. .............................. 369/13.07; 369/13.47; 428/694 MM
(58) Field of Classification Search ..................... None
See application file for complete search history.

(56) References Cited

U.S. PATENT DOCUMENTS 5,740,133 A 4/1998 Tamanoi et al.

(Continued)

FOREIGN PATENT DOCUMENTS

JP 4-48449 2/1992

(Continued)

*Primary Examiner*—Tan Dinh
(74) *Attorney, Agent, or Firm*—Hamre, Schumann, Mueller & Larson, P.C.

(57) ABSTRACT

It is an object of the present invention to provide a magneto-optical recording medium including a recording film having at least a reproduction layer, an intermediate layer, and a recording layer, on an optical disk substrate, wherein the recording film is a magnetic film that is magnetically coupled and that has magnetic anisotropy in a direction vertical to its film surface, the recording magnetic domains formed in the recording layer are transferred to the reproduction layer, and recording information is reproduced by domain wall movement in the reproduction layer, and the recording layer has columnar structures that are oriented substantially vertically. Thus, it is possible to provide a magneto-optical recording medium with which signals below the diffraction limit of the light spot for recording and reproducing information can be reproduced at high speed, with which the recording density and the transfer speed can be significantly increased, and with which stable recording magnetic domains can be formed even if recorded at high density.

25 Claims, 13 Drawing Sheets

U.S. PATENT DOCUMENTS

| | | | |
|---|---|---|---|
| 5,966,348 A * | 10/1999 | Hashimoto et al. | 369/13.47 |
| 6,027,825 A | 2/2000 | Shiratori et al. | |
| 6,197,440 B1 | 3/2001 | Shiratori | |
| 6,265,062 B1 * | 7/2001 | Shiratori | 369/13.47 |
| 6,687,197 B1 * | 2/2004 | Matsumoto | 369/13.38 |
| 6,690,626 B2 * | 2/2004 | Birukawa et al. | 369/13.55 |
| 6,765,847 B2 * | 7/2004 | Birukawa et al. | 369/13.47 |
| 6,826,131 B2 * | 11/2004 | Kawaguchi et al. | 369/13.46 |

FOREIGN PATENT DOCUMENTS

| | | | | |
|---|---|---|---|---|
| JP | 4-176036 | 6/1992 | | |
| JP | 6-290496 | 10/1994 | | |
| JP | 9-180278 | 7/1997 | | |
| JP | 11-120636 | * 4/1999 | | 369/13.07 |
| JP | 11-126380 | 5/1999 | | |
| JP | 11-126381 | 5/1999 | | |
| JP | 11-306607 | * 5/1999 | | 369/13.07 |
| JP | 11-312342 | * 11/1999 | | 369/13.07 |
| JP | 2001-184727 | 7/2001 | | |
| JP | 2002-42393 | 2/2002 | | |

* cited by examiner mark length = 0.1 μm mark length = 0.15 μm mark length = 0.2 μm

MAGNETO-OPTICAL RECORDING MEDIUM HAVING A RECORDING LAYER OF COLUMNAR STRUCTURE

This application is a 371 of PCT/JP02/12289 Nov. 25, 2002.

TECHNICAL FIELD

The present invention relates to magneto-optical recording media with which information is recorded and erased using temperature increases caused by irradiation of a laser beam and with which recorded signals are read using magneto-optical effects, and to methods for manufacturing the same.

BACKGROUND ART

To date, various types of optical memories have been proposed as optical memories with which information can be reproduced by irradiating a light beam onto an information recording medium and detecting the light that is reflected. These include ROM (Read Only Memory) type memories in which information is recorded by phase pits, write-once type optical memories in which information is recorded by forming holes in a recording film by irradiation of a light beam, phase-change type optical memories in which recording is performed by changing the crystalline phase of a recording film by irradiation of a light beam, and magneto-optical memories in which recording is performed by changing the direction of magnetization of a recording layer by irradiating a light beam and applying a magnetic field.

In these optical memories, the reproduction resolution of signals is determined almost entirely by the wavelength $\lambda$ of the reproduction light beam and the numerical aperture (N.A.) of the objective lens, and the pit period at the detection limit was substantially $\lambda/(2 \cdot N.A.)$. However, since it is not easy to shorten the wavelength of the reproduction light beam or to increase the numerical aperture of the objective lens, attempts to increase the recording density of information by modifying the recording medium or the reproduction method have been undertaken. In particular, various attempts to increase the recording density of information in magneto-optical recording media have been proposed. For example, JP H6-290496A proposes a technology for increasing the reproduction resolution by exceeding the detection limit that is determined by the wavelength and the numerical aperture of the objective lens as mentioned above by successively moving magnetic domain walls that have approached the reproduction light beam and detecting the movement of these magnetic domain walls. With this technology, a particularly good reproduction signal can be obtained when the reproduction layer, which is a first magnetic layer in which magnetic domain walls are moved when they have approached the reproduction light beam, is magnetically separated between information tracks.

However, the reproduction of recorded information by transferring tiny recording magnetic domains that have been recorded at high density on a recording layer to a reproduction layer and moving the magnetic domain walls of the reproduction layer, for example, requires that the tiny magnetic domains of the recording layer are kept stable and are very stably transferred to the reproduction layer through magnetic coupling. In particular, there is the problem that the vertical magnetic anisotropy of the recording layer becomes small depending on the composition or manufacturing method of the recording film, and thus it is difficult to form tiny recording magnetic domains stably. Moreover, stable magnetic coupling that employs the vertical magnetic anisotropy of the recording layer is necessary in order to transfer the recording magnetic domains of the recording layer to the reproduction layer, and there is the problem that if transfer is not stable due to changes in the transferability related to the magnetic properties of the recording layer, then there is an increase in transfer noise and noise that accompanies magnetic domain wall movement, and this lowers the quality of the reproduced signal.

Further, to carry out magnetic domain wall movement stably, methods such as magnetically separating information tracks by laser annealing or using an optical disk substrate having a land/groove structure to isolate information tracks from one another have been adopted, but there is the problem that the transferability from the recording layer to the reproduction layer changes depending on the conditions of the laser annealing or the groove shape of the lands and grooves of the optical disk substrate, and that the effect of the groove noise from the optical disk substrate is large. In particular, there is the problem that if grooves are deep or narrow, then when recording to grooves there is a drop in magnetic coupling, such as the exchange coupling force, between the recording layer and the reproduction layer.

DISCLOSURE OF THE INVENTION

The present invention was developed at in order to solve these problems of the conventional art, and it is an object thereof to provide a magneto-optical recording medium with which signals below the diffraction limit of the light spot for recording and reproducing information can be reproduced at high speed, with which the recording density and the transfer speed can be significantly increased, and with which stable recording magnetic domains can be formed even if recorded at high density, and a method for manufacturing the same.

It is a further object of the present invention to provide a magneto-optical recording medium with which excellent signal properties can be attained using a reproduction method that employs DWDD (domain wall displacement detection), even if recording at high densities where the mark length is 0.3 µm or less, and which has excellent transfer properties and is stable with regard to repeated recording and reproducing even if recording to grooves of the optical disk substrate, and a method for manufacturing the same.

To achieve the above objects, a magneto-optical recording medium of the present invention includes a recording film having at least a reproduction layer, an intermediate layer, and a recording layer on an optical disk substrate, wherein the recording film is a magnetic film that is magnetically coupled and that has magnetic anisotropy in the direction vertical to its film surface, the recording magnetic domains formed in the recording layer are transferred to the reproduction layer, and recording information is reproduced due to domain wall movement in the reproduction layer, wherein the recording layer includes columnar structures oriented substantially vertically.

Next, a method for manufacturing a magneto-optical recording medium of the present invention is a method for manufacturing a magneto-optical recording medium that includes a recording film having at least a reproduction layer, an intermediate layer, and a recording layer on an optical disk substrate, wherein the recording film is a magnetic film that is magnetically coupled and that has magnetic anisotropy in the direction vertical to its film surface, and the recording magnetic domains formed in the recording layer are transferred to the reproduction layer, and recording information is reproduced by domain wall movement in the reproduction layer, the method including disposing in a vacuum chamber a target made of a magneto-optical recording medium material and the optical disk substrate at a position in opposition to the target, and forming a recording film having a columnar structure that is oriented substantially vertically on the optical disk substrate, which is stationary or rotating, by magnetron sputtering in a non-oxidative atmosphere using a target having a composition for forming the recording film.

BEST MODE FOR CARRYING OUT THE INVENTION

Figure 1:
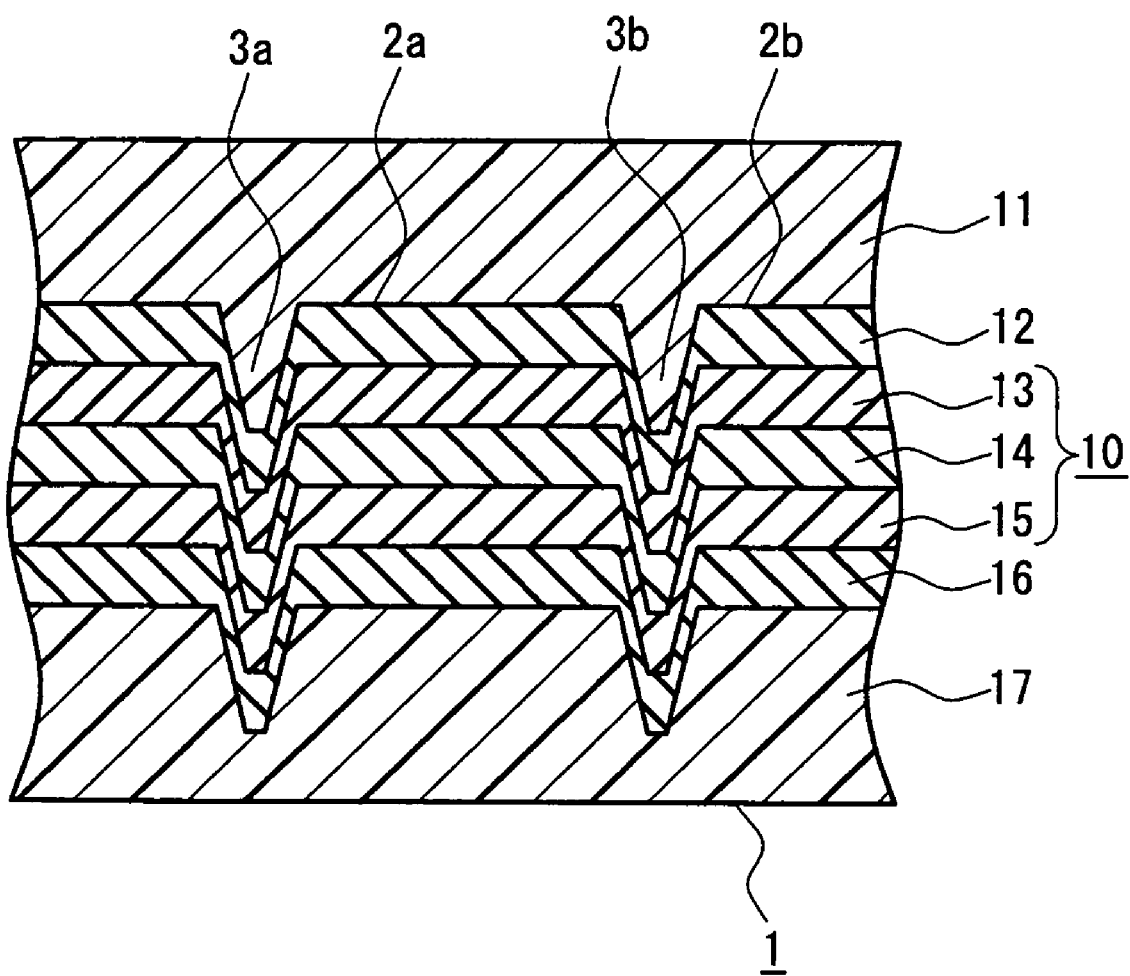
FIG. 1 is a cross-sectional view of the magneto-optical recording medium according to the first embodiment of the present invention.

In the present invention, the recording layer has a pillar-shaped structure (hereinafter, also referred to as "columnar structure") orientated substantially vertically with respect to the film surface. In the above description, "substantially vertically" is used to refer to a range within ±20° vertical, and more preferably a range within ±10° vertical.

In the present invention, it is preferable that the recording layer has a porous structure.

It is further preferable that at this time the recording layer has a magnetic thin film density from 2.0 g/cm$^3$ to 5.0 g/cm$^3$, and that the amount of Ar atoms in the recording layer is greater than 0.5 mol %.

In the case of the above description it is further preferable that the width of the columnar units of the columnar structures of the recording layer is from 2 nm to 40 nm, and moreover that the recording layer is from 40 nm to 300 nm thick.

It is also possible for the direction of the columnar structure of the recording film to be slanted with respect to the direction vertical to the film surface at border portions between adjacent tracks of a recording track region of the recording layer. It is preferable that the slant angle is in a range from 10° to 45°.

It is yet further preferable that at least the intermediate layer or the control layer includes a columnar structure, wherein a width of the columnar structural units is from 2 nm to 40 nm and their thickness is from 5 nm to 80 nm.

It is further preferable that at least one of the recording layer, the intermediate layer, and the control layer is formed of an alloy thin film of a rare-earth metal and a transition metal, and that as the rare-earth metal at least Tb, Gd, Dy, or Ho is included.

It is yet further preferable that the reproduction layer is a fine amorphous layer with random atom order, and that the reproduction layer has a fine structure that does not have structural units of 2 nm or more.

In the magneto-optical recording medium of the present invention, it is also preferable that the reproduction layer has a smaller magnetic domain wall coercive force than that of the recording layer, and that, in this case, preferably the reproduction layer is a multilayer structure and has a configuration in which there are different Curie temperatures or compensation composition temperatures.

In the magneto-optical recording medium of the present invention, it is further preferable that magnetization is isolated at least in the reproduction layer or the recording layer by land portions formed between groove portions or slanted portions between grooves, and recording magnetic domains formed in the recording layer are transferred to the reproduction layer only from the groove portions of the optical disk substrate and recording information is reproduced by domain wall movement in the reproduction layer.

It is further preferable that in the above case the width of the groove portions is from 0.2 μm to 0.8 μm and the depth of the groove portions is in a range from $\lambda/20n$ to $\lambda/3n$, and that a land surface in which the shape between groove portions is rectangular or an inverted V-shape and whose height is in a range from 20 nm to 80 nm is formed between the groove portions.

It is further preferable that the coupling between the reproduction layer, the intermediate layer, and the recording layer is at least one form of coupling selected from exchange coupling and magnetostatic coupling. In the present invention, the coupling between layers is most preferably exchange coupling, but it is also possible for magnetostatic coupling to be included at any location.

In the method for manufacturing a magneto-optical recording medium according to the present invention, it is preferable that the pressure within the vacuum chamber is in a range from 1 Pa to 6 Pa during formation of the recording layer having columns, and moreover that Ar gas, Kr gas, or Ne gas is introduced into the vacuum chamber.

In this case, it is further preferable that the deposition speed during manufacturing of the recording layer is from 0.5 nm/sec to 10 nm/sec.

When the magneto-optical recording medium of the present invention is used it is possible to provide a method for reproducing a magneto-optical recording medium that includes a reproduction step wherein when reproducing, a laser beam spot is irradiated from the reproduction layer side while it is moved relative to the magneto-optical recording medium, and the light reflected from the medium is used to apply tracking control while a temperature distribution having a gradient with respect to the direction in which the laser beam spot is moved over the medium is formed, and a temperature distribution that has a higher temperature region than a temperature region in which the force that is generated in a magnetic domain wall that acts to move the magnetic domain wall formed in the reproduction layer toward the higher temperature side of the temperature distribution is greater than the coupling force that occurs from the recording layer via the intermediate layer is formed in the reproduction layer, the transferred magnetic domain information from the recording layer is formed in the reproduction layer within the light spot, and the magnetic domains are expanded due to magnetic domain wall movement in the reproduction layer and detected as a change in the polarization plane of the light reflected from the light spot.

In the method for manufacturing a magneto-optical recording medium of the present invention, it is preferable that in the reproduction step, information is detected by expanding the size of the recording magnetic domains that are transferred in a stepwise manner in the depth direction of the reproduction layer by magnetic domain wall movement.

When the magneto-optical recording medium of the present invention is used it is possible to provide a device for reproducing a magneto-optical recording medium that is provided with tracking control means that uses the light reflected from the magneto-optical recording medium when reproducing, and heating means for moving a laser beam spot relative to the magneto-optical recording medium while forming a temperature distribution having a gradient in the direction of movement of the laser beam spot, wherein the device includes means for transferring and forming information from the recording layer within the light beam spot to the reproduction layer and detecting information signals from transferred magnetic domains, which have been provided expanded by magnetic domain wall movement in the reproduction layer, as a change in the polarization plane of the light that is reflected form the light spot.

The present invention is described in greater detail below through embodiments.

First Embodiment

Hereinafter, embodiments of the present invention are described in detail with reference to the drawings. FIG. 1 is a cross-sectional view showing the structure of a magneto-optical recording medium (hereinafter, referred to as "magneto-optical disk") of a first embodiment of the present invention. That is, the magneto-optical disk is constituted by a transparent optical disk substrate 11 made of polycarbonate, a dielectric layer 12 for protecting the recording film and for adjusting the optical properties of the medium, a reproduction layer 13 for detecting information of the layered recording film by movement of magnetic domain walls, an intermediate layer (hereinafter, also referred to as "intermediate isolating layer") 14 for controlling exchange coupling between the reproduction layer and the recording layer, and a recording layer 15 that retains information. Additionally, reference numeral 16 denotes a dielectric layer for protecting the recording film, and 17 denotes an overcoat layer 2a and 2b denote grooves and 3a and 3b denote lands. The recording layer 13, the intermediate layer 14, and the recording layer 15 together make up a recording film 10.

The magneto-optical recording media of the first embodiment according to the present invention shown in FIG. 1 can be adopted for the magneto-optical recording medium using DWDD (domain wall displacement detection), in which magnetic domain walls that have approached the reproduction light beam are successively moved and the movement of the magnetic domain walls is detected, to allow super resolution reproduction surpassing the detection limit, which is determined by the wavelength of the reproduction light beam and the numerical aperture of the objective lens.

It should be noted that as regards the recording film layered as above, it is only necessary that it is a magnetic film that permits DWDD, which is a method in which displacement of the magnetic domain walls is utilized to increase the amplitude of the reproduction signal, and for example, it is possible to use the magnetic film set forth in JP H6-290496A, in which a magnetic layer having a large interface coercivity is employed as a recording layer, a magnetic film having a small interface coercivity is employed as a reproduction layer in which magnetic domain walls are displaced, and a magnetic film having a relatively low Curie temperature is employed as an intermediate layer for switching. Consequently, there is no limitation to this film configuration.

Figure 2A:
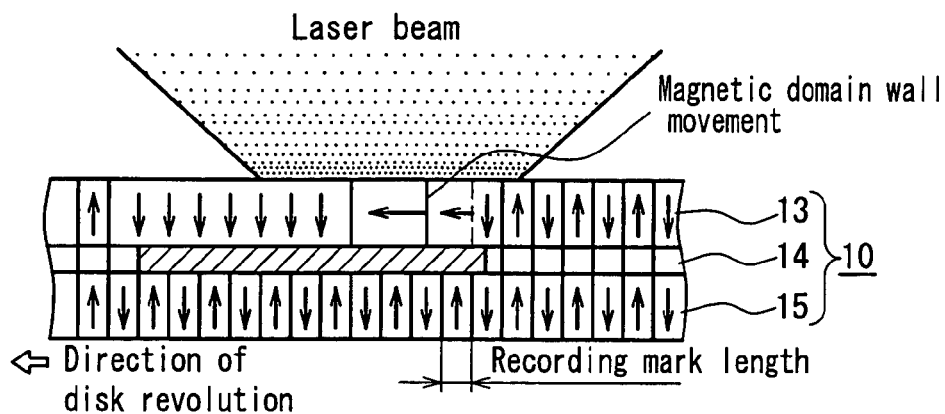
FIG. 2A is a cross-sectional view showing the direction of magnetization of the recording film the magneto-optical recording medium according to the first embodiment of the present invention.

The underlying principle behind the DWDD technique discussed above is described with reference to FIGS. 2A to 2D. FIG. 2A is a diagram showing a cross section of a recording film of a disk that is rotating. The recording film 10 having three layers, namely the reproduction layer 13, the intermediate layer 14, and the recording layer 15, is formed above an optical disk substrate (not shown) and a dielectric layer, a dielectric layer is formed on the recording film 10, and then, although not shown, a protective coating layer of UV cured resin is formed.

A magnetic film material with a small magnetic domain wall coercivity is used as the reproduction layer 13, a magnetic film with a small Curie temperature is used as the intermediate layer 14, and a magnetic film that can retain recording magnetic domains, even those with small domain diameters, is used as the recording layer 15. Here, the reproduction layer in conventional magneto-optical recording media formed a magnetic domain structure that included unclosed magnetic domain walls by forming guard bands, for example.

As shown in FIG. 2A, information signals are formed as recording magnetic domains thermomagnetically recorded to the recording layer 15. Since the recording layer 15, the intermediate layer 14, and the reproduction layer 13 of the reproduction film are strongly exchange coupled to one another at room temperature, in which a laser light spot it not being irradiated thereto, the recording magnetic domains of the recording layer are transferred to and formed in the recording layer unchanged. The configuration illustrated here is one in which the recording layer 15, the intermediate layer 14, and the reproduction layer 13 are directly exchange coupled to one another, but it is also possible to adopt a configuration in which a layer for adjusting exchange coupling, or a non-magnetic thin film layer, is inserted between these layers so that they are magnetostatically coupled.

Figure 2B:
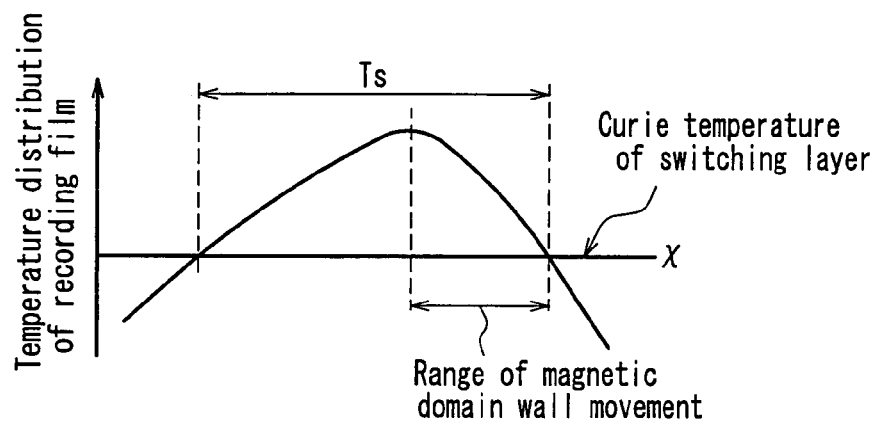
FIG. 2B is a property diagram showing the temperature distribution within the medium with respect to the position of the same magneto-optical recording medium during the reproduction operation.

FIG. 2B plots the relationship between a position X corresponding to the cross-sectional view of FIG. 2A and a temperature T of the recording film. As shown in this diagram, when reproducing recorded signals, the disk is rotated and a reproduction beam spot resulting from the laser light is irradiated along a track. At this time the recording film exhibits a temperature distribution such as that shown in FIG. 2B, wherein the intermediate layer includes a temperature region Ts that exceeds the Curie temperature Tc and isolates exchange coupling between the reproduction layer and the recording layer.

Figure 2C:
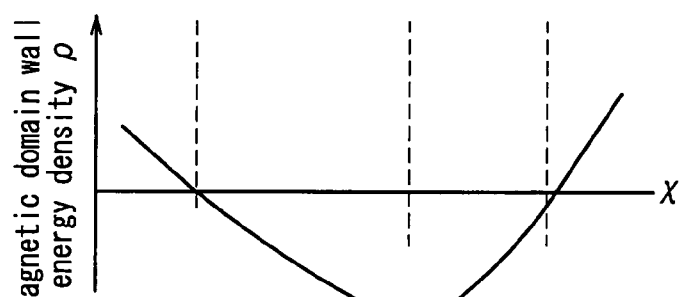
FIG. 2C is a property diagram showing the magnetic domain wall energy density of the reproduction layer of the same.
Figure 2D:
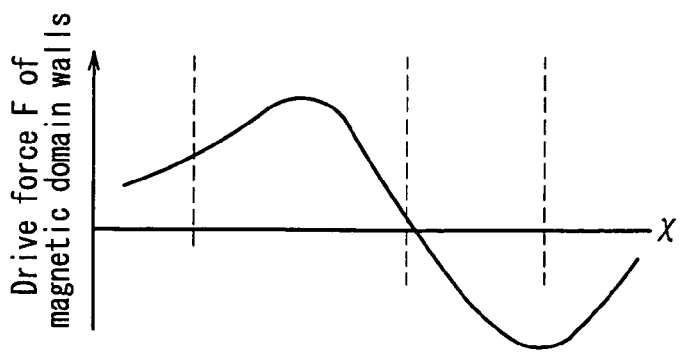
FIG. 2D is a property diagram showing the force that acts to move the magnetic domain walls of the reproduction layer of the same.

Also, when the reproduction beam is irradiated, a force F that drives the magnetic domain walls acts upon the magnetic domain walls of the layers at the position X as shown in FIG. 2D, due to the presence of a gradient of the magnetic domain wall energy density σ in the X direction of the disk rotation direction corresponding to the position of FIG. 2A, as illustrated by the dependence on the magnetic domain wall energy density σ of FIG. 2C.

The force F that acts on the recording film acts to move the magnetic domain walls toward a low magnetic domain wall energy density σ as shown in FIG. 2D. The reproduction layer has a small magnetic domain wall coercivity and thus the degree of movement of magnetic domain walls is large, and therefore magnetic domain walls are easily moved by the force F in a single reproduction layer that has unclosed magnetic domain walls. Consequently, the magnetic domain walls of the reproduction layer are instantaneously moved to a region with a higher temperature and a smaller magnetic domain wall energy density as shown by the arrows. When a magnetic domain wall passes through the reproduction beam spot, the magnetization of the reproduction layer within the spot is aligned in the same direction across the wide region of the optical spot. As a result, the reproduction signal amplitude is always a constant maximum amplitude, regardless of the size of the recording magnetic domain.

However, conventional DWDD formats require stable recording, even for tiny domains, in order to move the magnetic domain walls of the reproduction layer, which has a domain structure that includes magnetic domain walls that are not closed and isolates exchange coupling between tracks, and have the problem that the reproduction signal fluctuates depending on the shape of the recording magnetic domains and the transfer to the reproduction layer.

The configuration and the fabrication method for a magneto-optical disk 1 according to the first embodiment of the present invention are described in detail below. As shown in FIG. 1, a recording film in which multiple layers including the magnetic films discussed above have been layered is fabricated on the optical disk substrate 11. In the optical disk substrate 11, land portions 3a and 3b are formed on either side of grooves 2a and 2b, and a depth h of the groove portions of the rectangular grooves is 50 nm from the upper surface of the land portions. Also, the track pitch of the magneto-optical disk 1 of the present embodiment is 0.8 μm and its groove width is 0.6 μm.

As shown in FIG. 1, first a ZiS.SiO$_2$ target is placed in a magnetron sputtering device and a transparent optical disk substrate 11 which is made of polycarbonate and in which grooves have been formed is fastened to a substrate holder, after which the inside of the chamber is evacuated with a cryopump until a high vacuum of $6 \times 10^{-6}$ Pa or less is attained. With the chamber still in an evacuated state, Ar gas is introduced into the chamber until reaching a pressure of 0.5 Pa and while rotating the substrate the ZiS.SiO$_2$ is sputtered at high frequency to form an 80 nm thick film serving as a dielectric layer on the optical disk substrate 11.

Next, with the chamber in a similarly evacuated state, Ar gas is introduced into the chamber up to 0.5 Pa, and while rotating the substrate, Gd, Fe, Co, and Al targets are used to form a 30 nm thick reproduction layer 13 made of GdFeCoAl on the dielectric layer 12 by DC magnetron sputtering. Ar gas is then introduced into the chamber up to 1.8 Pa and Tb, Dy, Ho, Fe, Co, and Al targets are used to form a 15 nm thick intermediate isolating layer 14 made of TbDyFeCoAl, and then, with the same target composition, Ar gas is introduced into the chamber up to 2.0 Pa and a 60 nm thick recording layer 15 made of TbHoFeCo is formed through DC magnetron sputtering. Here, the film composition of the layers can be set to a desired film composition by adjusting the introduction power ratio of the targets.

Next, Ar gas is introduced into the chamber up to 0.6 Pa, and while rotating the substrate, a second dielectric layer 16 made of ZiS.SiO$_2$ is formed at a thickness of 100 nm through high frequency sputtering.

Next, an overcoat layer 17 made of an epoxy acrylate-based resin is formed on the dielectric layer 16 by providing the resin in a dropwise manner and then applying it at a 6 μm film thickness (thickness after curing) by spin coating and curing it by irradiating with a UV lamp.

The compensation composition temperature of the reproduction layer 13 made of GdFeCoAl is 150° C. and its Curie temperature is 270° C., the intermediate isolating layer 14 made of TbDyFeCoAl has a Curie temperature of 150° C., and below its Curie temperature the rare-earth metal composition is always dominant. The recording layer 15 made of TbHoFeCo is formed by adjusting its composition by setting the introduction power ratio of the targets such that its compensation composition temperature is 80° C. and its Curie temperature is 290° C.

By controlling the film fabrication speed and the number of revolutions of the optical disk substrate during film fabrication, it is possible to provide the reproduction layer 13 made of GdFeCoAl in an amorphous film structure having tiny structural units of 0.8 nm or less, and to form the intermediate isolating layer 14 and the recording layer 15 as magnetic films with columnar structures having structural units whose width is 10 nm and 15 nm, respectively. More specifically, the above film structure can be obtained by fabricating the reproduction layer 13 made of GdFeCoAl at a rate of 15 nm/sec while rotating at 100 rpm, fabricating the intermediate isolating layer 14 made of TbDyFeCoAl at a rate of 5 nm/sec while rotating at 40 rpm, and fabricating the recording layer 15 made of TbHoFeCo at a rate of 8 nm/sec while rotating at 40 rpm. Thus, providing at least the recording layer with a columnar structure enables stable high-density recording and reproduction of signals even if overwriting is carried out repeatedly.

The optical disk substrate 11 of the magneto-optical disk 1 having the above configuration is a shape having rectangular lands and grooves, but reproduction by DWDD as discussed above is possible as long as a configuration in which the magnetic domain walls of recording magnetic domains transferred to the reproduction layer in the same fashion as above are easily moved is adopted, even if grooves in which information is recorded are magnetically isolated from one another by the land portions and deep lands are formed or the area between recording tracks is annealed.

Further, in the present embodiment, the effect is even greater in the case of a configuration in which land portions are formed in a structure where the track pitch is 1.0 µm or less and the width between the grooves on which information is recorded is in the range of 0.2 µm to 0.8 µm, and recording marks whose shortest mark length of recorded information is 0.3 µm or less are recorded.

It should be noted that the recording layer of the magneto-optical recording medium of the present embodiment is not limited to the above configuration, and equivalent reproduction properties can be obtained as long as it is a configuration in which a recording layer having a columnar shape whose structural units have a width from 2 nm to 40 nm, and more preferably from 5 nm to 20 nm, is formed, and in which the film thickness of the recording layer is at least 40 nm and more preferably from 60 nm to 200 nm.

Figure 3:
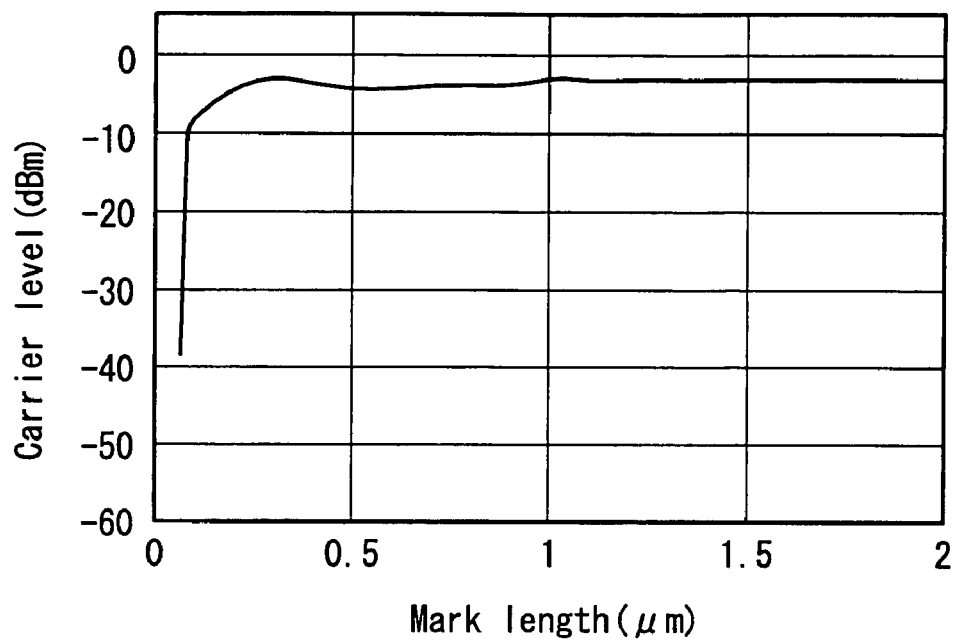
FIG. 3 is a property diagram showing the relationship between the carrier level and the mark length of the magneto-optical recording medium according to the first embodiment of the present invention.

FIG. 3 shows the relationship between the carrier level and the mark length in the magneto-optical recording medium of the present embodiment. As shown in FIG. 3, in this embodiment the film structure of the recording layer is columnar in shape and has excellent stability with tiny domains, and thus recording magnetic domains are stably transferred to the reproduction layer 13 and magnetic domain wall movement is possible even in the case of recording magnetic domains with a mark length of 0.1 µm, and thus the signal amplitude is increased.

In the configuration of the present embodiment, the magnetization of the recording film is separated between grooves by the land portions and thus information is recorded on grooves in which the reproduction layer includes magnetic domain walls that are not closed, but equivalent properties can be obtained with a configuration in which information is written to the land portions instead or in which information is written to both the lands and the grooves. Thus, with the configuration of the present embodiment it is possible to obtain stable reproduction signal properties, even if recording and reproducing at high density with DWDD.

Further, in the case of the present embodiment in which recording is made to grooves, the width and the depth of the grooves affect the recording and reproduction properties in DWDD, but as long as in the magneto-optical recording medium the relationship between the groves and the height of the land portions of the present invention is such that the track pitch is from 0.4 µm to 1.0 µm, the groove width is from 0.2 µm to 0.8 µm, and the groove depth is in a range from 20 nm to 200 nm, equivalent effects can be obtained.

If the height of the land portions between the groove portions to which information is recorded is small, on the order of $\lambda/20n$ to $\lambda/3n$, then the optical disk substrate is easily molded and noise from the grooves can be reduced.

As shown above, the present invention adopts a configuration in which a recording film having columns on which recording information can be rewritten is employed such that a degree of movement of the magnetic domain walls can be ensured by stably forming tiny domains of not more than 0.3 µm and such that it is possible to enlarge the reproduced signal by moving transferred magnetic domains using DWDD. Moreover, since information is stably recorded and reproduced to and from recording and reproduction tracks, it is also possible to prevent cross-writing and cross-talk between adjacent tracks when recording and reproducing.

Second Embodiment

Figure 4:
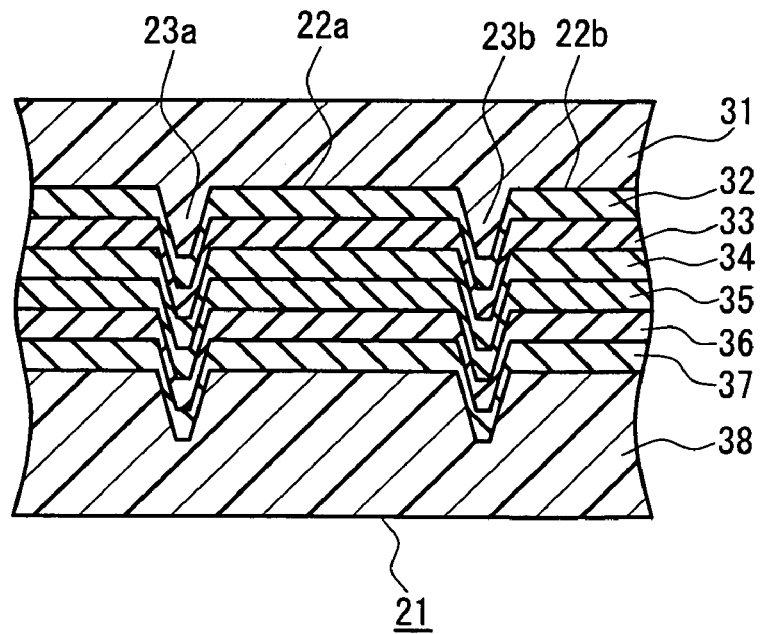
FIG. 4 is a cross-sectional view of the magneto-optical recording medium according to the second embodiment of the present invention.

A second embodiment of the present invention is described in detail next with reference to the drawings. FIG. 4 is a cross-sectional view showing the structure of a magneto-optical disk 21 according to a second embodiment of the present invention. In FIG. 4, reference numeral 31 denotes an optical disk substrate made of polycarbonate, in which tracks lined up in the width direction are formed as grooves and the tracks, to which information is recorded, and are separated by inverse V-shaped land portions 23a and 23b provided at the border between tracks. Reference numerals 22a and 22b denote grooves.

Figure 5:
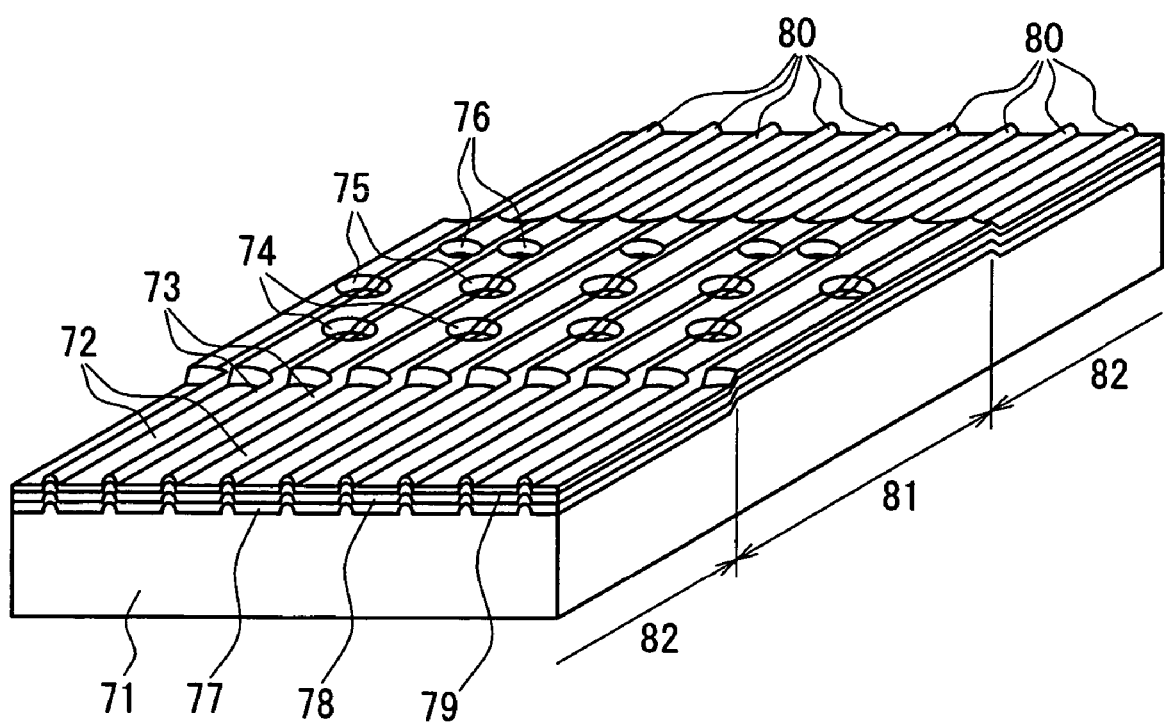
FIG. 5 is a perspective view showing the magneto-optical recording medium according to the second embodiment of the present invention.

Also, FIG. 5 is a cross-sectional perspective view showing an example of the configuration in the format of the present invention. The format shown in FIG. 5 is adopted in the present embodiment, in which regions 82 of rewritable groove portions and pit regions 81 in which wobble pits 74 and 75 for servo and address pits 76 are formed are lined up in alternation on the tracks. Consequently, this format is a configuration with which the address is detected while applying tracking servo by the sample servo method, for example, and information can be written to and reproduced from rewritable regions. In FIG. 5, reference numeral 71 denotes a substrate, 72 denotes grooves, 73 denotes lands, 77 denotes a first dielectric layer, 78 denotes a recording film, 79 denotes a second dielectric layer, and 80 denotes annealed regions.

In this case, a configuration having a prepit and groove portion depth in a range from $\lambda/20n$ to $\lambda/3n$ if $\lambda$ is the laser light wavelength, or in a range from 20 nm to 180 nm, allows prepits such as the address pits to be detected and moreover allows recording and reproduction with DWDD by magnetically isolating tracks from one another by groove recording.

As shown in FIG. 4, the magneto-optical disk 21 of the present embodiment is constituted by a transparent optical disk substrate 31 made of polycarbonate, a dielectric layer 32 for protecting the recording film and for adjusting the optical properties of the medium, a layered recording film constituted by four layers, these being a reproduction layer 33 for detecting information due to movement of the magnetic domain wall, a control layer 34 for reducing ghost signals, an intermediate layer (intermediate isolating layer) 35 for controlling exchange coupling between the reproduction layer and the recording retaining layer, and a recording layer 36 that retains information, a second dielectric layer 37 for protecting the recording film, and an overcoat layer 38 formed thereon.

With this configuration, the magneto-optical recording medium of the second embodiment, like that of the first embodiment, can be adopted as a magneto-optical recording medium that permits super resolution reproduction surpassing the detection limit, which is determined by the wavelength of the reproduction light and the numerical aperture of the objective lens, by successively moving the magnetic domain walls that have approached the reproduction light beam and detecting movement of the magnetic domain walls.

The land portions 23 are formed on the optical disk substrate 31 of the magneto-optical disk 21 in the present embodiment at the border between the grooves 22, to which information is recorded, the depth h of the groove portions 22 is 40 nm from the upper surface of the land portions 23, and due to the land portions, the groove portions 22 are magnetically independent from one another between adjacent tracks. Also, the track pitch of the magneto-optical disk 21 of the present embodiment is 0.6 μm and the groove width is 0.45 μm.

Figure 6:
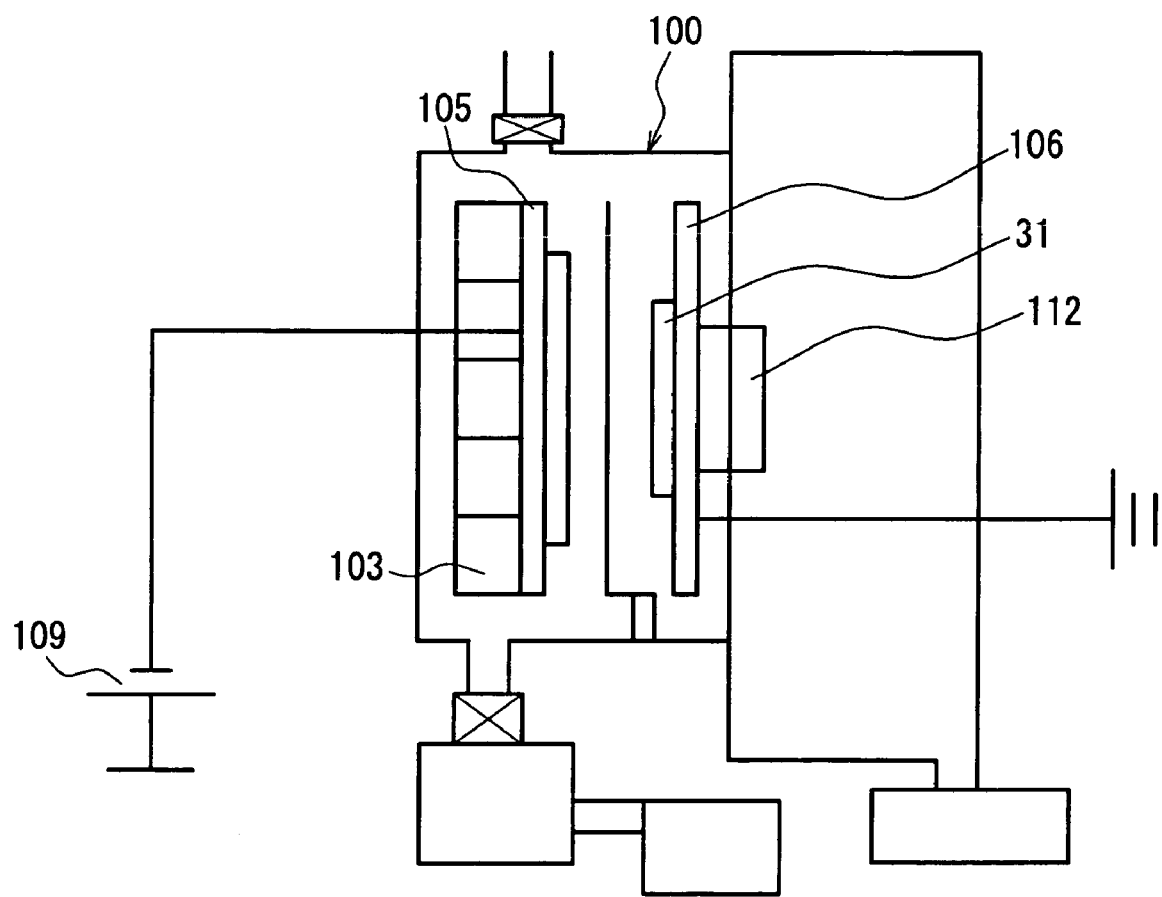
FIG. 6 is a structural diagram that schematically shows a device for manufacturing the magneto-optical recording medium according to the second embodiment of the present invention.

As shown in the cross-sectional structural diagram FIG. 6 of a film-formation device for the magneto-optical recording medium, the magneto-optical disk 21 with the configuration shown in FIG. 4 is fabricated by forming a thin film on the optical disk substrate 31, which is held by a substrate holder 106 disposed at a position in opposition to an alloy target 105 for the recording film within a vacuum chamber 100, while rotating the substrate holder. When formation of the film has finished, the resulting product is moved to another vacuum chamber together with the substrate holder by a vacuum carrying mechanism 112, and then a recording film of a different material or a different composition is formed. A cathode 103 in which a magnet is disposed is provided on the rear surface of the target, the cathode is supplied with power by a DC power source 109, and the recording film and the dielectric film are formed through magnetron sputtering.

First, as shown in FIG. 4, a B-doped Si target is placed in a DC magnetron sputtering device and the transparent optical disk substrate 31, which is made of polycarbonate and in which grooves have been formed, is fastened to the substrate holder, after which the inside of the chamber is evacuated by a turbomolecular pump until a high vacuum on the order of $8\times10^{-6}$ Pa or less is attained. With the chamber still in an evacuated state, Ar gas and $N_2$ gas are introduced into the chamber until a pressure of 0.3 Pa, and while rotating the substrate, a 40 nm SiN film is sputtered onto the optical disk substrate 31 as the dielectric layer 32 by reactive sputtering.

A reproduction layer 33 made of GdFeCoCr is then formed on the dielectric layer 32 with the chamber similarly evacuated and introducing Ar gas into the chamber until a pressure of 0.6 Pa is reached, and while rotating the substrate, successively forming films each 10 nm using an alloy target with the composition $Gd_{25}Fe_{60}Co_{11}Cr_4$, an alloy target with the composition $Gd_{24}Fe_{58}Co_{10}Cr_8$, and an alloy target with the composition $Gd_{23}Fe_{55}Co_9Cr_{13}$ (compositions are mol %).

Next, a 10 nm control layer 34 made of TbFeCoCr, a 15 nm intermediate isolating layer 35 made of TbDyFeCr, and a 100 nm recording layer 36 made of TbFeCoCr are formed in that order through DC magnetron sputtering. Ar gas and $N_2$ gas are subsequently introduced into the chamber until a pressure of 0.3 Pa is reached, and while rotating the substrate, a 70 nm second dielectric layer 37 made of SiN is formed by reactive sputtering. An overcoat layer 38 made of an epoxy acrylate-based resin is applied onto the second dielectric layer 37 by spin coating and cured by irradiating it with UV radiation.

The reproduction layer 33 of the present embodiment is constituted by three magnetic film layers, each with a different composition. The reproduction layer 33 made of GdFeCoCr includes three compositions, these being a layer whose compensation composition temperature is 160° C. and whose Curie temperature is 230° C., a layer whose compensation composition temperature is 140° C. and whose Curie temperature is 200° C., and a layer whose compensation composition temperature is 120° C. and whose Curie temperature is 170° C. The Curie temperature of the control layer 34 made of TbFeCoCr is 160° C., and below its Curie temperature the transition metal composition is always dominant. The Curie temperature of the intermediate isolating layer 35 made of TbDyFeCr is 145° C., and below its Curie temperature the transition metal composition is always dominant. Also, the composition of the recording layer 36 made of TbFeCoCr is adjusted such that its compensation composition temperature is 100° C. and its Curie temperature is 260° C.

The structure of the magnetic thin films can be altered by controlling the Ar gas pressure, the film fabrication speed, and the number of revolutions of the optical disk substrate held by the substrate holder during film fabrication. More specifically, by depositing and layering the reproduction layer 33, which has a three-layered structure and is made of GdFeCoCr, with the number of substrate revolutions at 300 rpm, a film formation Ar pressure of 0.6 Pa, and a film formation speed of 15 nm/sec, it is possible to form the reproduction layer 33 in an amorphous film structure that does not have tiny columnar units below 1.0 nm. For the 10 nm thick control layer 34 made of TbFeCoCr and the 15 nm thick intermediate isolating layer made of TbDyFeCr, by setting the number of substrate revolutions to 100 rpm, the Ar gas pressure during film formation to 3.0 Pa, and the film formation speed to 5 nm/sec, in both cases it is possible to form a magnetic thin film with pillar-shaped columns having structural units with a width of 10 nm. Moreover, for the recording layer made of TbFeCoCr, by setting the number of substrate revolutions to 80 rpm, the Ar gas pressure during film formation to 4.5 Pa, and the film formation speed to 10 nm/sec, it is possible to form a 100 nm thick magnetic thin film with pillar-shaped columns having a structural unit width of 20 nm.

Figure 7A:
FIG. 7A is a cross-sectional view showing the recording layer of the magneto-optical recording medium according to the second embodiment of the present invention observed with SEM (magnification ratio: ×100,000)

FIG. 7A shows a cross-sectional view in which a cross section of the recording layer and the reproduction layer are observed at high resolution with SEM. The sample used for SEM observation at this time is a structure in which a magnetic thin film with a film thickness of 100 nm was formed on a polycarbonate optical disk substrate whose track pitch is 0.8 μm and groove width is 0.45 μm.

Figure 7B:
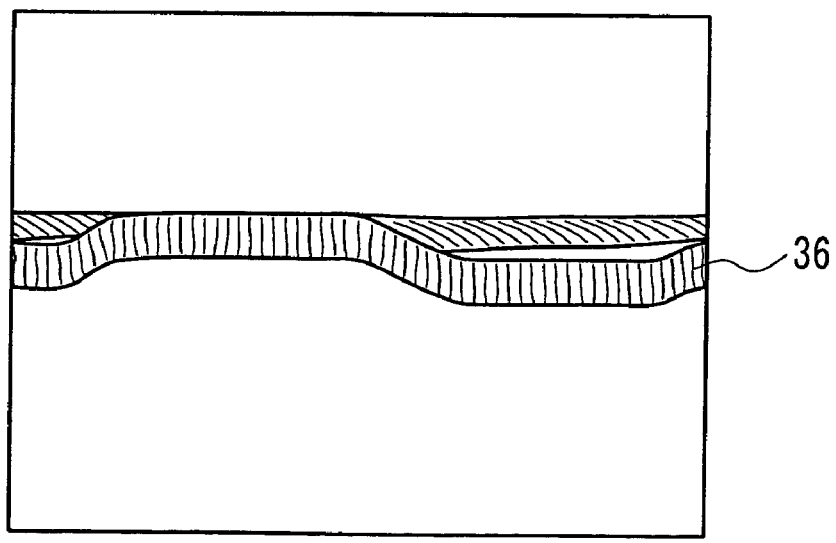
FIG. 7B is a diagrammatic representation of FIG. 7A.

As shown in the cross-sectional view of FIG. 7A, it can be seen that at ×100,000 magnification captured with a SEM (scanning electron microscope) the recording layer 36 made of TbFeCo in FIG. 7A has a structure in which the magnetic thin film has a columnar shape in the direction vertical to the film surface. FIG. 7B is a diagrammatic representation of FIG. 7A. Reference numeral 36 denotes the recording layer.

Figure 8A:
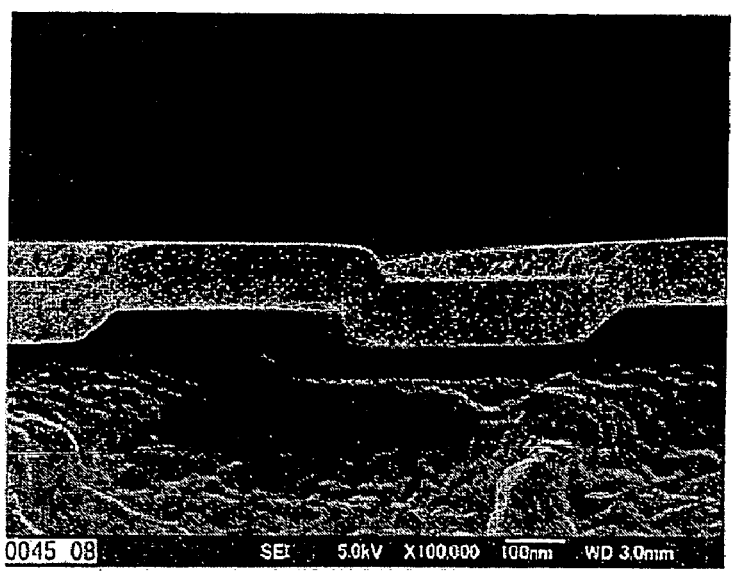
FIG. 8A is a cross-sectional view showing the reproduction layer of the magneto-optical recording medium according to the second embodiment of the present invention observed with SEM (magnification ratio: ×100,000)
Figure 8B:
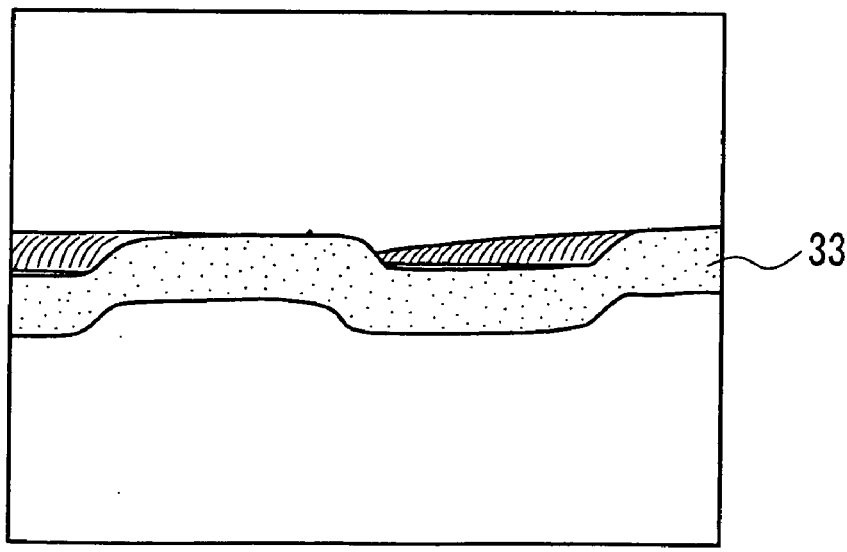
FIG. 8B is a diagrammatic representation of FIG. 8A.

By contrast, as shown in the cross-sectional view of FIG. 8A at ×100,000 magnification with a SEM, it is clear that the reproduction layer made of GdFeCoCr is formed as an amorphous thin film whose structure is so tiny that its structural units are hardly observable. FIG. 8B is a diagrammatic representation of FIG. 8A. Reference numeral 33 denotes the reproduction layer.

Moreover, at the slanted portions between adjacent grooves, the columnar structural units of the TbFeCo recording layer are slanted with respect to the vertical direction of the film surface, and due to these slanted structural units, the grooves of the information tracks are magnetically insulated from one another. As a result, as in the present embodiment, the groove portions can be employed as rewrite regions when recording and reproducing using DWDD so that at least a portion of the recording film is magnetically isolated between adjacent grooves, and by stably performing magnetic domain wall movement of the domains transferred to the reproduction layer 33 from the recording layer 36 to permit the reproduction of signals whose signal amplitude has been increased is possible even if the mark length is short.

It should be noted that the magneto-optical recording medium of the present embodiment has the columnar structures shown in the sectional views of FIGS. 7A and 7B, but as long as a recording layer having structural units whose width is from 2 nm to 40 nm is formed and the film thickness of the recording layer is at least 40 nm and more preferably from 60 nm to 200 nm, then columns can be formed easily and equivalent recording and reproduction properties at high density are obtained. Also, by providing the recording layer with pillar-shaped columns, signals can be recorded and reproduced stably even if rewriting is carried out repeatedly. In the example shown here the recording layer 36 employs TbFeCoCr, but it is also possible to add 10 mol % or less of Ti, Pt, or Al, for example, in addition to Cr in order to increase the corrosion resistance.

Also, the magneto-optical recording medium 21 of the above configuration has lands and grooves, and the grooves, to which information is recorded, are magnetically isolated from one another by the slanted portions, but the magnetic domain wall movement of recording magnetic domains that have similarly been transferred to the reproduction layer is easy, and reproduction using DWDD as discussed above is possible, even if a method such as forming deep lands or annealing the area between information tracks is adopted.

In the present embodiment, the effect is even greater in the case of a configuration in which land portions are formed in a configuration where the track pitch is 0.1 µm or less and the groove width is in the range of 0.2 µm to 0.8 µm, and where information signals whose shortest mark length is 0.3 µm or less are recorded.

Figure 9:
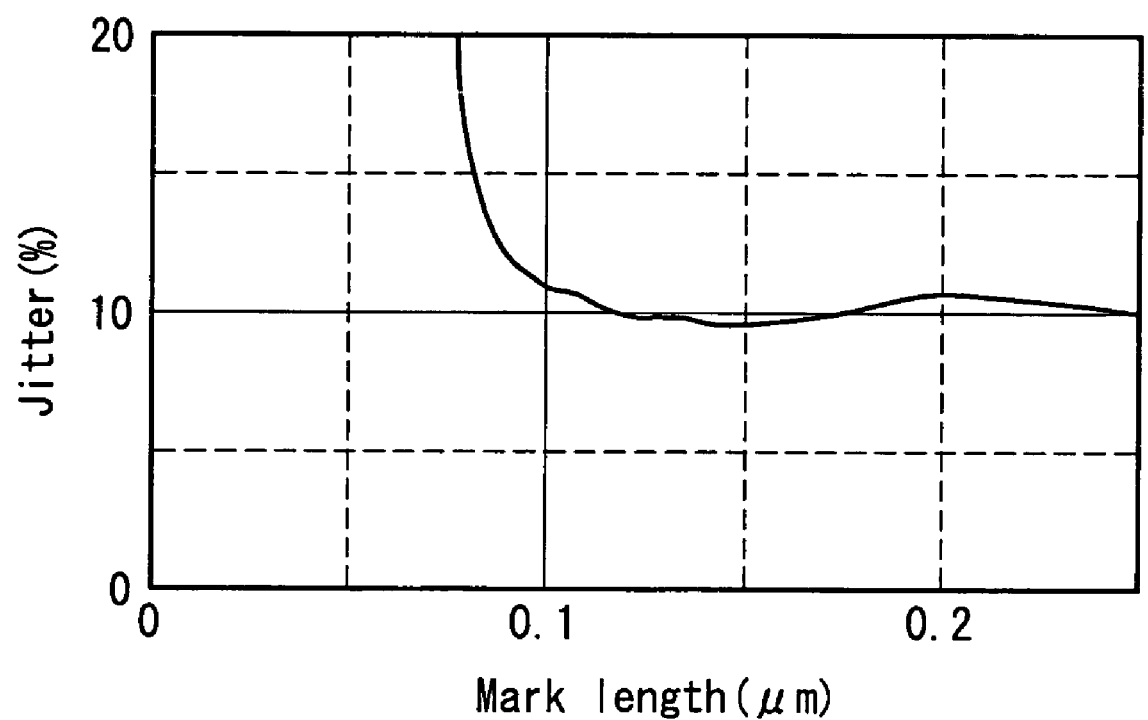
FIG. 9 is a property diagram showing the relationship between the jitter and the mark length of the magneto-optical recording medium according to the second embodiment of the present invention.

FIG. 9 shows the relationship between the jitter in the reproduction signal and the mark length when recording and reproducing signals to and from the magneto-optical recording medium of the present embodiment. As shown in FIG. 9, in the present embodiment, recording magnetic domains are stably formed even when the mark length is short, and even recording magnetic domains whose mark length is 0.1 µm can be transferred to the reproduction layer 33 and reproduced by moving the magnetic domain walls, and thus by expanding the signal amplitude and reproducing it is possible to obtain jitter of 13% or less.

Figure 10A:
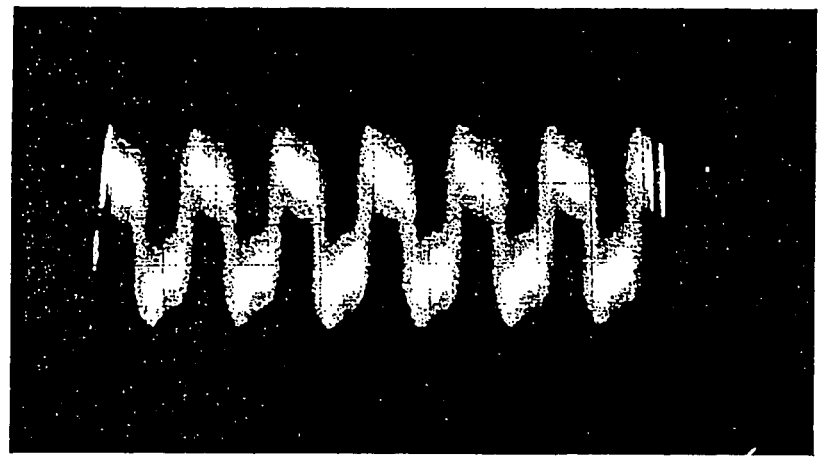
FIG. 10A is a diagram showing the reproduction waveform at a mark length of a 0.1 μm in the magneto-optical recording medium according of the second embodiment of the present invention.
Figure 10B:
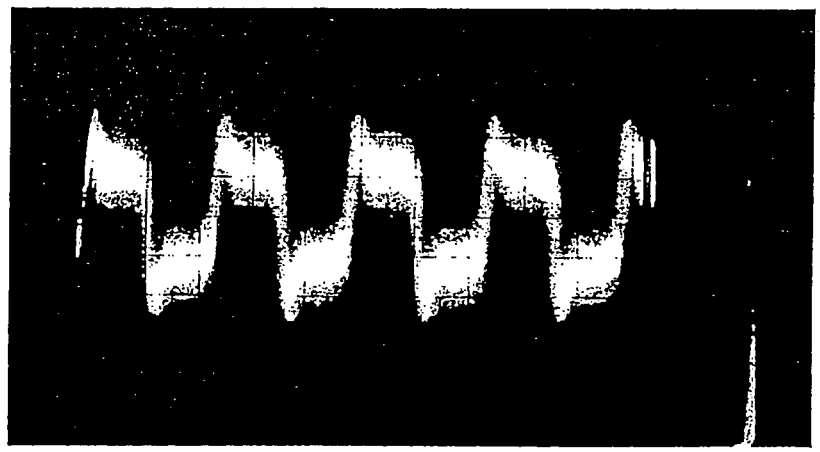
FIG. 10B is a diagram showing the reproduction waveform at a mark length of 0.15 μm for the same.
Figure 10C:
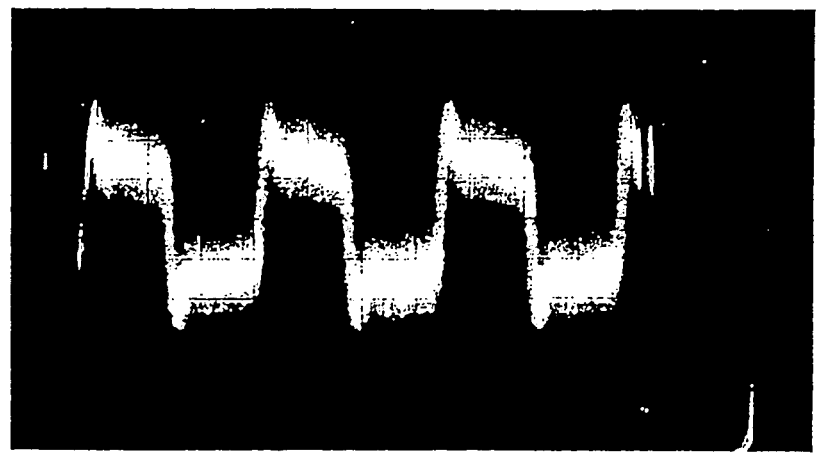
FIG. 10C is a diagram showing the reproduction waveform at a mark length of 0.2 μm for the same.

Further, FIG. 10A shows the reproduction wave form at a mark length of 0.1 µm, FIG. 10B shows the reproduction wave form at a mark length of 0.15 µm, and FIG. 10C shows the reproduction wave form at a mark length of 0.2 µm. From these diagrams it is clear that the amount of amplification of the reproduction signal is substantially saturated at a 0.1 µm mark length and that it is possible to achieve a magneto-optical recording medium with excellent reproduction signal properties resulting from the stable transfer from the recording layer and the DWDD operation due to magnetic domain wall movement in the reproduction layer.

Figure 11:
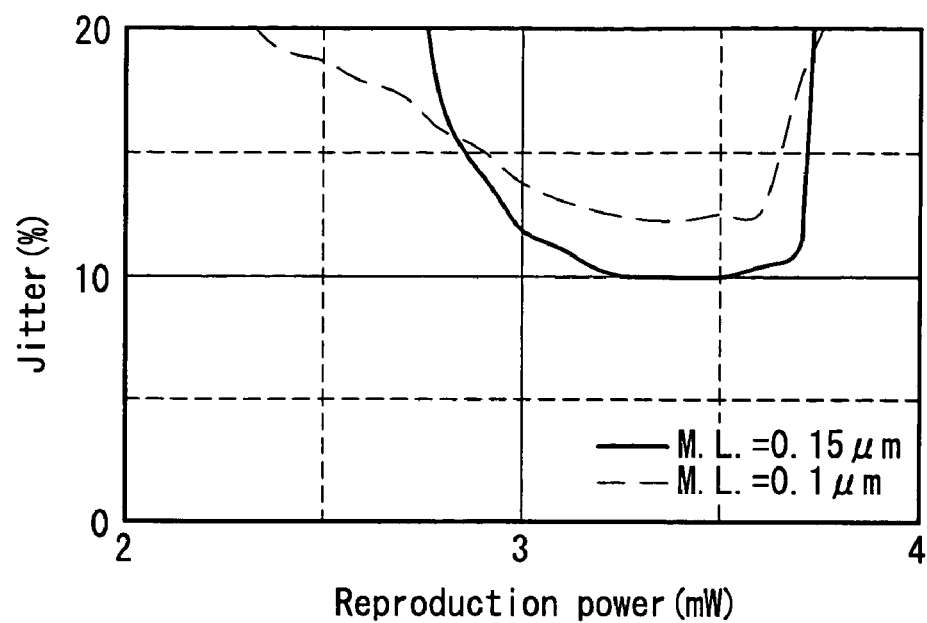
FIG. 11 is a property diagram showing the relationship between jitter and the reproduction power at mark lengths of 0.1 μm and 0.15 μm of the magneto-optical recording medium according to the second embodiment of the present invention.

FIG. 11 shows the relationship between jitter and the reproduction power at mark lengths of 0.1 µm and 0.15 µm. Here, signals are recorded by light pulse magnetic field modulation recording and the linear velocity is 2.4 m/s. In this case, as shown in FIG. 11, it is clear that jitter is smallest at a reproduction power of 3.5 mW and that sufficient reproduction signal properties can be obtained without hardly any change in reproduction jitter, even if the reproduction power is altered within a range of ±20%.

The following investigation was performed using an optical disk substrate like that of the present embodiment, with a 0.6 µm track pitch, a 0.45 µm groove width, a 40 nm height difference between lands and grooves, and a groove surface roughness of 1.5 nm or less.

Figure 12:
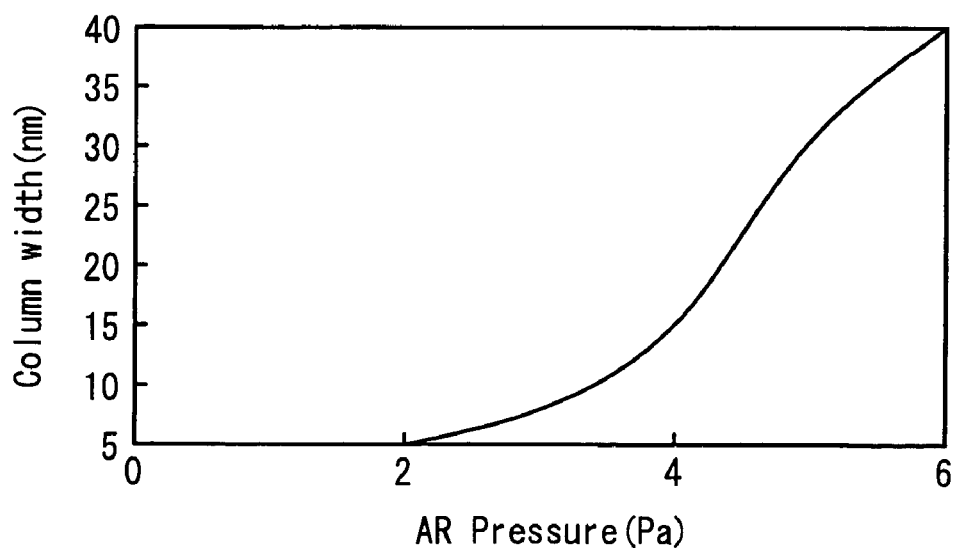
FIG. 12 is a property diagram showing the width of the columnar structure with respect to Ar pressure of the magneto-optical recording medium according to the second embodiment of the present invention.

First, FIG. 12 shows the relationship between the width of the column shapes and the Ar pressure during film formation. As shown in FIG. 12, increasing the Ar pressure results in an increase in the width of the column shapes, and at an Ar pressure of 1.8 Pa or more it is possible to form a columnar structure whose structural units have a width of 5 nm or more. The same effects can be obtained at a pressure of 1 Pa or more, even if Kr, Ne, or Xe is used. Also, the width of the columns gradually increases by increasing the pressure up to 6 Pa, and at 5.8 Pa, columns with a width of 40 nm can be attained.

Taking the Ar flow amount and the evacuation speed during film formation into account, it is further preferable that the pressure is set to between 2.5 Pa and 4.5 Pa, in which case the same effects are achieved. Also, at this time the Ar flow amount can made as large as the capacity of the vacuum pump will allow, and it is preferable that at least 20 sccm are introduced.

At this time the density of the recording film drops, and if the film was formed at an Ar gas pressure of 3.0 Pa, then its density is half of that when the pressure is 0.5 Pa. Ar atoms are incorporated between the structural units of the recording film at this time, and this makes columnar structure formation easy.

Figure 13:
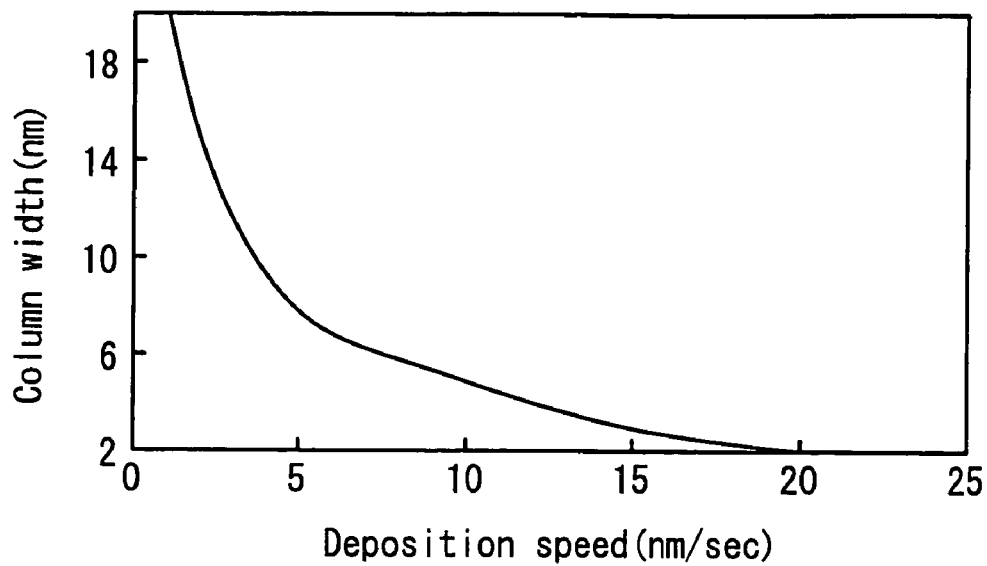
FIG. 13 is a property diagram showing the width of the columnar structure with respect to the deposition speed during formation of the films of the magneto-optical recording medium according to the second embodiment of the present invention.

FIG. 13 is a property diagram showing how the width of the column shapes depends on the deposition film formation speed of the magnetic film during film formation. As shown in FIG. 13, if the deposition film formation speed is large, on the order of at least 20 nm/sec, then the recording film develops a tiny amorphous structure and does not have pillar-shaped columns, but the width of the columns is increased by reducing the deposition film formation speed. It becomes possible to form pillar-shaped columns when the film formation speed is 15 nm/sec or less.

However, when the film formation speed is less than 1 nm/sec, the film formation time becomes long and the magnetic properties of the recording film deteriorate toward less rare-earth metals, resulting in a dramatic drop in the reproduction signal amount from the grooves, and thus the film formation speed is preferably between 2 nm/sec and 15 nm/sec and more preferably between 4 nm/sec and 10 nm/sec, as this allows a columnar structure to be formed. Here, the deposition film formation speed when producing the magnetic films can be set by adjusting the introduction power and by disposing a film thickness/film distribution correction plate, for example.

Figure 14:
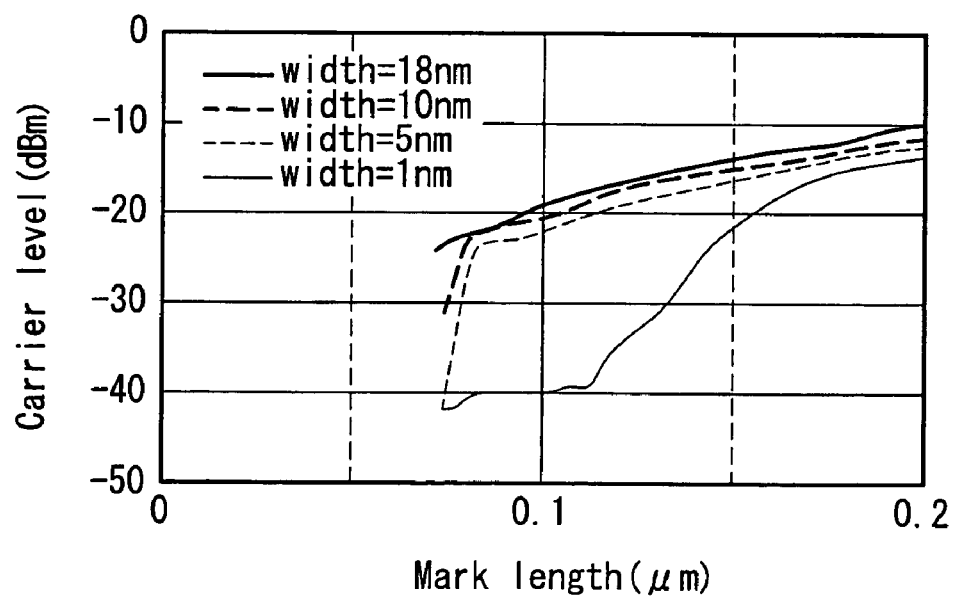
FIG. 14 is a property diagram showing the carrier level to mark length when there are different widths of the columnar structures in the magneto-optical recording medium according to the second embodiment of the present invention.

Further, FIG. 14 shows the limit of the minimum mark length from the relationship with the mark length at different widths of the columns of the recording layer, and is a graph of a case when the width of the columnar structural units is 1 nm, 5 nm, 10 nm, and 18 nm in an optical disk substrate with a 0.6 µm track pitch, a 0.45 µm groove width, and a 40 nm height difference between lands and grooves. The recording signal was evaluated at this time by recording the solitary waves for each mark length to the recording layer and measuring these as the change in signal level during reproduction.

As shown in FIG. 14, since these are solitary waves, the signal amount decreases as the mark length becomes shorter, but it is clear that recording magnetic domains below the optical limit can be detected and recording magnetic domains can be formed stably down to a mark length of 0.1 µm or less by setting the width of the columns of the recording layer to 5 nm or more. Also, recording at mark lengths of 0.1 µm was confirmed even when the width of the columns of the recording layer was set to 2 nm.

The shortest mark length of the limit of the recording layer depends on the vertical magnetic anisotropy, and as shown in the present embodiment, recording and reproduction at mark lengths of 0.1 µm or less is possible by forming columnar structures, setting the energy obtained by multiplying the magnetization and the coercive force (Ms·Hc product) to at least $1.2 \times 10^6$ erg/cm$^3$, and setting the vertical magnetic anisotropic coefficient Ku to at least $5 \times 10^5$ erg/cm$^3$, and more preferably setting Ku to at least $1 \times 10^6$ erg/cm$^3$.

Also, in the column shape discussed above, the film has a porous structure, and the recording film contains at least 0.8 mol % Ar atoms as long as the width of the columnar structural units is 5 nm or more, and the same effects can be achieved as long as the Ar atom content of the recording film is from 0.5 mol % to 4.0 mol %. Here, the Ar content is detected using EPMA (electron probe X-ray microanalysis) or RBS (Rutherford Backscattering), for example.

With the above columnar porous film structure, the recording layer is not as dense as the reproduction layer, and if the recording layer is a dense film like the reproduction layer, then it is formed as a thin film whose density at room temperature is 7 g/cm$^3$ or more, whereas particularly if it has columns whose structural units are from 5 nm to 40 nm, then it is formed as a thin film having a density at room temperature from 2.0 g/cm$^3$ to 5.0 g/cm$^3$.

Figure 15:
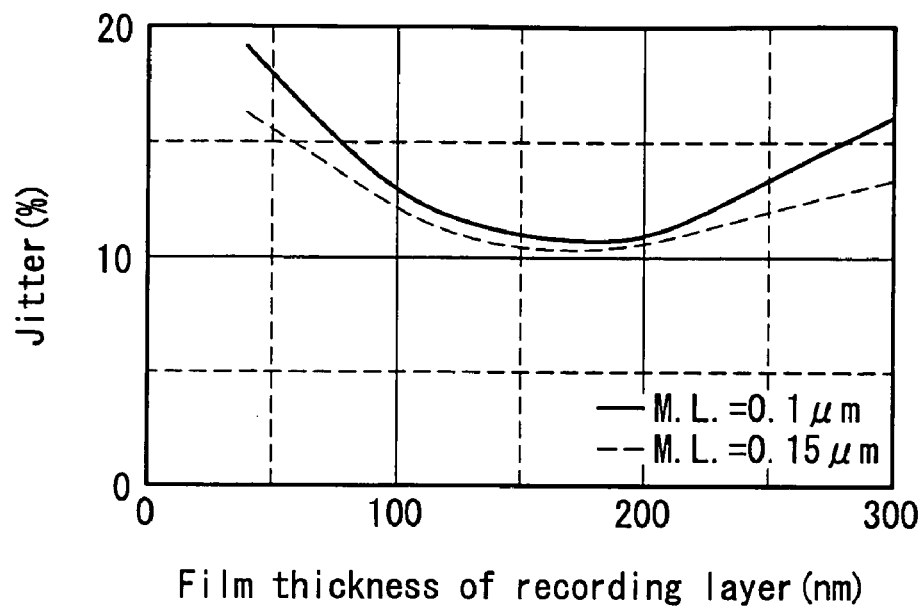
FIG. 15 is a property diagram showing the relationship between the jitter and the film thickness of the recording layer in the magneto-optical recording medium according to the second embodiment of the present invention.

Consequently, to improve the signal properties of a magneto-optical recording medium employing DWDD, it is clear that if the width of the columns of the recording layer is from 2 nm to 40 nm, and more preferably from 5 nm to 20 nm, then sufficiently stable magnetic anisotropy vertical to the film surface can be obtained, even if short marks of 0.1 µm or less are recorded, and it is possible to achieve equivalent high density recording and reproduction FIG. 15 illustrates the properties of jitter in the reproduction signal at 0.1 µm and 0.15 µm with respect to the thickness of the recording layer. As shown in FIG. 15, it is clear that jitter during signal reproduction is smallest in the range of 120 nm to 180 nm. The optimal value of the film thickness is different depending on the film composition and the magnetic properties of the recording layer, but it is clear that in a recording layer having columns it is easy to form the columns by making the film relatively thick, and it is clear that by setting the film thickness of the recording layer to between 40 nm to 300, and more preferably setting the film thickness to between 80 nm to 200 nm, it is possible have pillar-shaped columns and stably form recording magnetic domains in small marks and transfer magnetic domains to the reproduction layer. As a result, it is clear that recording magnetic domains can be formed stably at mark lengths of 0.1 µm or less.

Thus, with the present invention, it is possible to achieve a configuration having a magnetic film that can be reproduced using DWDD, in which the border portions between track regions to which recording information can be rewritten and adjacent tracks are magnetically isolated, and in which the recording layer is provided with columnar structures, and more specifically, by adopting a configuration in which the width of the columns of the recording layer is from 2 nm to 40 nm, and more preferably from 5 nm to 20 nm, the present invention allows movement of the magnetic domain walls to be secured and enables the reproduction signals to be expanded through movement of transferred domains using DWDD even at mark lengths of 0.2 µm or less.

Thus, with the configuration of the present embodiment, it is possible to obtain stable reproduction signal properties, even if recording and reproducing at high density using DWDD.

Third Embodiment

Figure 16:
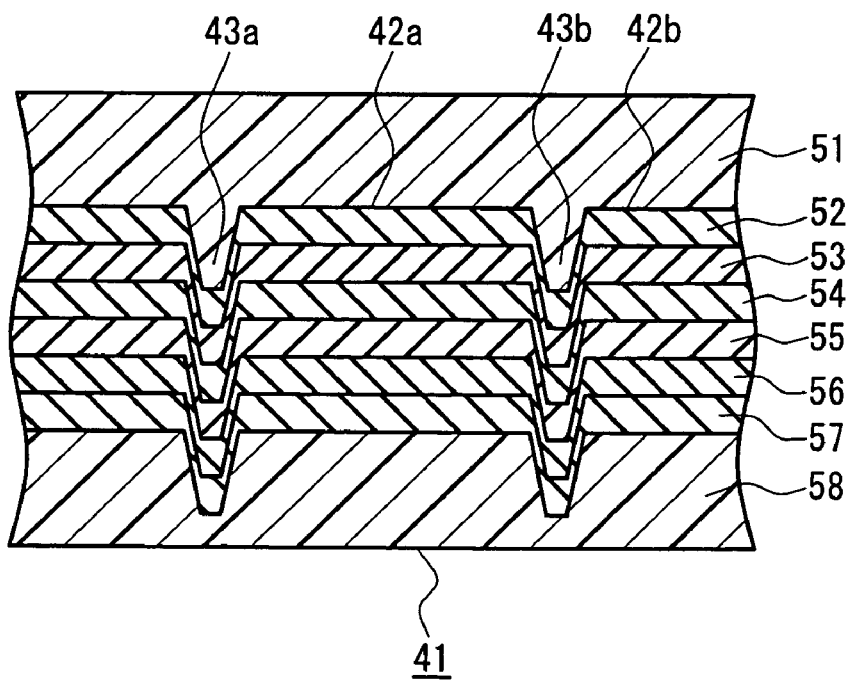
FIG. 16 is a cross-sectional view of the magneto-optical recording medium according to the third embodiment of the present invention.

A third embodiment of the present invention is described in detail next with reference to the drawings. FIG. 16 is a cross-sectional view showing the structure of a magneto-optical disk 41 according to a third embodiment of the present invention. In FIG. 16, reference numeral 51 denotes an optical disk substrate made of an ethylene-tetracyclododecene copolymer (a general name thereof is cyclic olefin copolymer or amorphous polyolefin (hereinafter referred to as "polyolefin")), tracks lined up in the width direction are formed as grooves 42, and tracks to which information is recorded are separated by inverse V-shaped land portions 43 at the border between grooves.

The magneto-optical disk 41 of the present embodiment, like that of the first embodiment of the present invention, is constituted by a transparent optical disk substrate 51 made of polyolefin, a dielectric layer 52 for protecting the recording film and for adjusting the optical properties of the medium, a layered recording film formed in a film structure including a reproduction layer 53 for detecting information by movement of magnetic domain walls, a control layer 54 for reducing ghost signals, an intermediate layer (intermediate isolating layer) 55 for controlling exchange coupling between the reproduction layer and the record retaining layer, and a recording layer 56 that retains information, a second dielectric layer 57 for protecting the recording film, and an overcoat layer 58 formed in that order.

The magneto-optical recording medium of the third embodiment of the present invention shown in FIG. 16, like the magneto-optical recording medium of the first embodiment, can be adopted as a magneto-optical recording medium that permits super resolution reproduction surpassing the detection limit, which is determined by the wavelength of the reproduction light and the numerical aperture of the objective lens, by successively moving the magnetic domain walls that have approached the reproduction light beam and detecting the movement of the magnetic domain walls.

The magneto-optical disk 41 of the present embodiment is formed by fabricating a multilayer layered film that includes magnetic layers on the above optical disk substrate 51. The land portions 43a and 43b are formed between the grooves 42a and 42b, the depth h of the groove portions 42a and 42b is 60 nm from the upper surface of the land portions 43a and 43b, and the land portions have an inverted V-shape. The groove portions 42a and 42b are magnetically independent of one another due to the land portions. Also, the track pitch of the magneto-optical disk 41 of the present embodiment is 0.5 μm and the groove width is 0.4 μm.

The magneto-optical recording medium 41 configured as shown in FIG. 16 is fabricated by forming thin films on the optical disk substrate 51, which is kept still at a position in opposition to the target, using the same fabrication device as in the second embodiment.

First, an 80 nm dielectric layer 52 made of SiN is formed on the optical disk substrate 51 by reactive sputtering. Then, magnetic films are formed on the dielectric layer 52 by DC magnetron sputtering using alloy targets. First, the reproduction layer 53 made of GdFeCoCr is formed by subsequently forming 10 nm films using four types of alloy targets, these being an alloy target with the composition $Gd_{26}Fe_{59}Co_{11}Cr_4$, an alloy target with the composition $Gd_{25}Fe_{57}Co_{10}Cr_8$, an alloy target with the composition $Gd_{24}Fe_{54}Co_9Cr_{13}$, and an alloy target with the composition $Gd_{23}Fe_{51}C_8Cr_{18}$ (compositions are mol %). Next, a 5 nm control layer 54 made of TbHoFeCo, a 10 nm intermediate isolating layer 55 made of TbHoFeAl, and a 120 nm recording layer 56 made of TbHoFeCo are formed in that order by DC magnetron sputtering using alloy targets. Next, an 80 nm second dielectric layer 57 made of SiN is formed by reactive sputtering. An overcoat layer 58 made of a urethane-based resin is applied onto the dielectric layer 57 by spin coating and cured through irradiation of UV radiation.

Here, the reproduction layer 53 made of GdFeCoCr is constituted by a reproduction layer that includes four compositions, these being a layer whose compensation composition temperature is 190° C. and whose Curie temperature is 270° C., a layer whose compensation composition temperature is 155° C. and whose Curie temperature is 220° C., a layer whose compensation composition temperature is 110° C. and whose Curie temperature is 170° C., and a layer whose compensation composition temperature is 80° C. and whose Curie temperature is 130° C. At this time, the Ar pressure during film formation is 0.8 Pa and the film formation speed is 13 nm/sec.

In the control layer 54 made of TbHoFeCo, Ho is contained at 20 mol % with respect to the Tb, the Curie temperature is 160° C., below its Curie temperature the transition metal composition is always dominant, and by forming the film at an Ar gas pressure of 2 Pa and a film formation speed of 4 nm/sec, it is possible to form a magnetic film having a structure whose columns have a width of 8 nm. The intermediate isolating layer 55 made of TbHoFeAl also contains Ho at 20 mol % with respect to the Tb, its Curie temperature is 145° C., and below its Curie temperature the transition metal composition is always dominant. Also, by forming the film at an Ar gas pressure of 2 Pa and a film formation speed of 5 nm/sec, it is possible to form a magnetic film having a structure whose columns have a width of 6 nm.

Further, the recording layer 56 made of TbHoFeCo is a magnetic film whose composition has been adjusted such that it contains 30 mol % Ho with respect to the Tb, its compensation composition temperature is 30° C., and its Curie temperature is 310° C. At this time, the film is formed at an Ar pressure of 3.5 Pa and a film formation speed of 6 nm/sec, and it is possible to form a magnetic film having a structure whose columns have a width of 12 nm.

Here, as shown in FIG. 16, a multilayer layered film including the above magnetic films is formed on the optical disk substrate 51, in which the land portions 43 are formed in an inverted V-shape at the border between the groove portions 42, and the depth h of the groove portions 42 is 60 nm from the upper surface of the land portions 43. The groove portions 42 are magnetically independent of one another due to the land portions 43. Also, the track pitch of the magneto-optical disk 41 of the present embodiment is 0.5 μm and the groove width is 0.4 μm.

With a configuration in which polyolefin is employed as the substrate material in the optical disk substrate configured as above, formation of the grooves 42 and the lands 43 through injection molding is possible even if the track pitch and the land width are small. Moreover, an optical disk substrate made of polyolefin has excellent transfer properties, and therefore as long as the difference in height between the grooves and the surface of lands is 80 nm or less, it is possible to form the grooves 42 and isolating regions constituted by land portions 43 with an even narrower width, and it is also possible to shorten the throughput for substrate formation.

Increasing the slant angle of the land portions or altering the surface roughness of the slant portions of the magneto-optical recording medium is also possible using the excellent transferability of the optical disk substrate made of polyolefin, and it is possible to reliably end coupling at the border between adjacent tracks of the groove portions 42, which are the recording/reproduction regions.

Also, stationary opposition type sputtering is employed for the magneto-optical recording medium 41 of the present embodiment, and compared to a case where the films are formed while rotating the optical disk substrate, for example, the films can be formed without a change in the direction of sputtering particles, and thus a uniform recording film composition that corresponds to the distribution of the target composition can be obtained and magnetic films can be deposited and grown vertically, so that if a columnar film structure is formed the effect is even greater.

Figure 17:
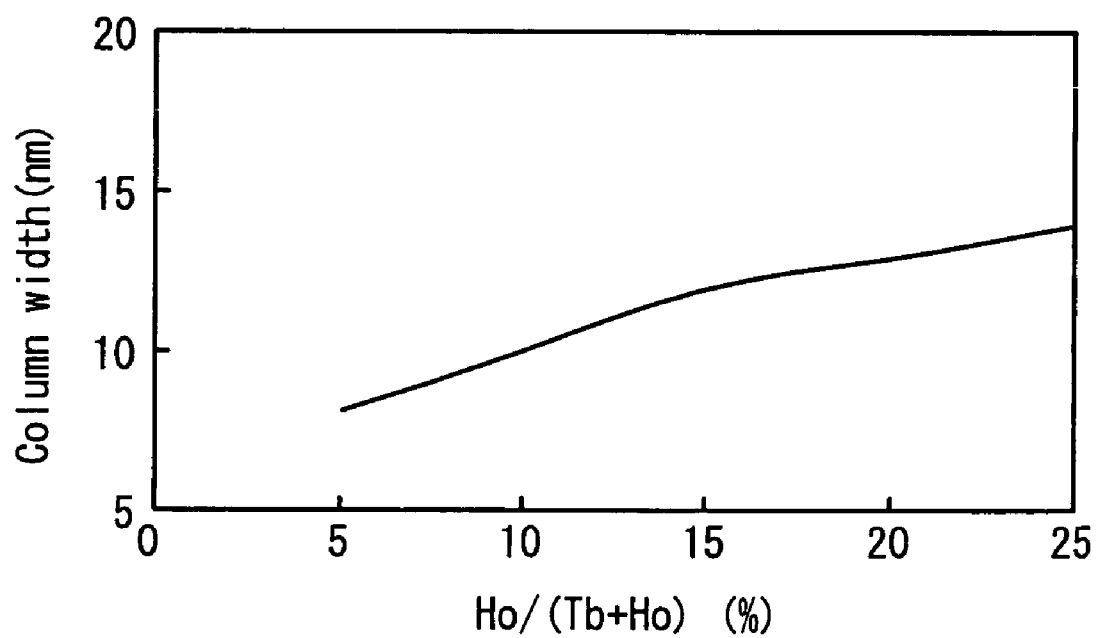
FIG. 17 is a property diagram showing the relationship between the width of the columnar structures and the amount of Ho contained in the magneto-optical recording medium according to the third embodiment of the present invention.

FIG. 17 shows the relationship between the width of the columns and the amount of Ho among the rare earth metals of the recording layer. The properties shown here are when an optical disk substrate made of polyolefin that has a track pitch of 0.5 μm and a groove width of 0.4 μm is used. As shown in FIG. 17, the width of the columns increases as the amount of Ho added is increased. The formation of columns can be confirmed when Ho is added at 5 mol % with respect to the Tb amount, and the width of the columns can be changed within a range of added Ho from 10 mol % to 40 mol %. Here, the Ar pressure during film formation is set to 3.5 Pa, the film formation speed is set to 6 nm/sec, and the film thickness is set to 100 nm.

Thus, with the magneto-optical recording medium of the present embodiment, it is possible to achieve a magneto-optical recording medium having a magnetic film that can be reproduced using DWDD, in which the cycle time during manufacturing can be shortened due to the target composition with respect to which it is in stationary opposition, and moreover, which has excellent signal properties during high-density recording due to the columnar structure of the recording film. Moreover, due to its configuration in which there are regions that are magnetically isolated by the land portions or by laser annealing, for example, the overwrite power margin also can be expanded when overwriting by rewriting information signals.

Thus, as long as the magneto-optical recording medium of the present embodiment has a configuration in which at least the recording layer has a columnar film structure, and more specifically, a configuration in which a recording layer having columns whose structural units have a width from 2 nm to 40 nm, and more preferably from 5 nm to 20 nm, is formed, and the thickness of the recording layer is 50 nm or more, and more preferably from 60 nm to 200 nm, then it is possible to obtain excellent stability in the recording magnetic domains and excellent reproduction signal properties even in the case of short marks.

Recording and reproducing methods, and recording and reproduction devices, for the magneto-optical recording media of the embodiments of the present invention are described next. One example of a recording and reproduction method, and a recording and reproduction device, for the magneto-optical recording media of the embodiments of the present invention is a reproduction method in which the recording domains that have been formed in the recording layer of the magneto-optical recording medium are transferred to the reproduction layer, and then, due to magnetic domain wall movement in the reproduction layer, the reproduction signals of the recording layer are detected using a magneto-optical recording and reproduction device configured so as to allow recording and reproduction to and from the magneto-optical recording medium of the present embodiment described above at a reproduction power that is higher than normal.

Among such methods for recording and reproducing a magneto-optical recording medium, there is a method for reproducing a magneto-optical recording medium configured such that information is recorded, reproduced, and erased by laser light, wherein when reproducing, a laser beam spot is irradiated from the reproduction layer side while it is moved relative to the magneto-optical recording medium, and the light reflected from the magneto-optical recording medium is used to apply tracking control while a temperature distribution having a gradient is formed in the direction in which the laser beam spot is moved over the magneto-optical recording medium, and by forming a temperature distribution in the reproduction layer that is a higher temperature region than a temperature region in which the force that is generated in the magnetic domain wall that acts to move the magnetic domain wall formed in the reproduction layer toward the higher temperature due to the temperature distribution at this time is greater than the coupling force that occurs in the reproduction layer from the recording layer via the intermediate layer, the transferred magnetic domain of information from the recording layer is formed in the reproduction layer within the light spot and the information that is expanded due to the magnetic domain wall movement in the reproduction layer is detected as a change in the polarization plane of the light reflected from the light spot.

Also, as described in the above embodiment of the present invention, there is a method for reproducing a magneto-optical recording medium in which information is detected by expanding the size of the recording magnetic domains that are transferred in a stepwise manner in the depth direction of the reproduction layer through magnetic domain wall movement. Furthermore, there is a method for reproducing a magneto-optical recording medium configured such that the coupling force that is generated via the intermediate layer of the magneto-optical recording medium is any one of a magnetic coupling force, an exchange coupling force, or a magnetostatic coupling force, wherein magnetic domains are transferred from only a temperature range from which signals can be transferred due to the magnetic coupling force between the recording layer and the reproduction layer, and the magnetic domains that have been transferred are expanded and their signals are detected.

Thus, in the present invention it is possible to achieve a method for recording and reproducing a magneto-optical recording medium that has a configuration including a magnetic film that can be reproduced using DWDD as described above and in which the border regions between track regions to which recording information can be overwritten and adjacent tracks are magnetically isolated, thereby allowing the mobility of the magnetic domain walls of the magneto-optical recording medium to be ensured, and in which the columnar structural units of the recording layer are larger than those of the reproduction layer, thereby allowing the recording magnetic domains of the recording layer to be stabilized, allowing the mobility of the magnetic domain walls when reproducing signal of magnetic domains transferred to the reproduction layer to be ensured, and allowing reproduction signals to be stably detected.

It should be noted that the magneto-optical recording medium of the above embodiments has been discussed with regard to a configuration in which an optical disk substrate employing polycarbonate or polyolefin was used, but it is also possible to adopt a configuration in which a glass substrate is processed directly or with photolithography to form guide grooves or prepits therein, or a configuration in which the optical disk substrate employs an epoxy based resin or other plastic material.

Magneto-optical recording media wherein optical disk substrates of the above embodiments are provided with spiral or circular guide grooves or prepits as tracking guides for the light spot have been described, but it is also possible to use an optical disk substrate having a configuration in which meandering spiral guide grooves having address information or prepits for the meandering tracking guides of the sample servo format, for example, are provided on the optical disk substrate.

Further, the track pitch of the optical disk substrate of the present embodiments is from 0.5 μm to 0.8 μm and the groove width is from 0.4 μm to 0.6 μm, but it is also possible to adopt a configuration in which the area between the grooves of the information recording tracks of the above configuration is a rectangular or inverted V-shaped land or groove so as to isolate recording tracks from one another, the track pitch is 1.0 μm or less, and there are grooves or land portions having a width from 0.2 μm to 0.8 μm between lands or grooves to which information is recorded. It is also possible to achieve a magneto-optical recording medium with an even higher density by further reducing the track pitch or annealing the area between recording tracks.

It is also possible to adopt a configuration in which the surface roughness of the land surfaces or the land surfaces and the slanted surfaces between the groove portions is made large on the order of Ra (L)≧1.5 nm and the inside of the grooves to which information is recorded is formed as a smooth surface whose Ra (G)≦1.5 nm. Thus, it is possible to achieve a significant effect in the magnetic domain wall movement properties with the DWDD operation due to magnetically isolating adjacent grooves from one another or magnetically isolating the area between recording tracks at the border between the land surface and the slanted surface, and by further annealing the area between the information recording tracks, it is possible to achieve an excellent magneto-optical recording medium for use with DWDD.

Also, the magneto-optical recording medium of the above embodiments has been discussed regarding a configuration in which an SiN film and a $ZnSSiO_2$ film are used as the first and second dielectric layers, but it is also possible to use a ZnS film or other chalcogen compound films, films of oxides such as $TaO_2$, films of nitrides such as AlN, or thin films made of mixtures of these. It is only necessary that the thickness of the dielectric layers is within the range of 20 nm to 300 nm so as to increase the signal amount due to the enhancement effect.

Also, the magneto-optical recording medium of the above embodiments has been discussed with regard to a configuration in which the magnetic films making up the various layers of the magneto-optical recording medium is a recording film layered using GdFeCoAl or GdFeCoCr as the reproduction layer, TbDyFeCo, TbDyFeCr, TbFeCoCr, TbHoFeCo, or TbHoFeAl as the control layer and the intermediate isolating layer, and a TbHoFeCo, TbFeCo, or TbFeCoCr film as the recording layer, but it is also possible to use rare earth-transition metal based ferromagnetic amorphous alloys such as TbFe, TbHoFe, TbCo, GdCo, GdTbFe, GdTbFeCo, GdTbHoFeCo, DyFeCo, or GdFeCoSi; a magneto-optical material employing a polycrystalline material made of an Mn-based magnetic film such as MnBi, MnBiAl, or PtMnSn; a platinum group-transition metal alloy such as garnet, PtCo, or PdCo; a metal such as Pt/Co or Pd/Co; or platinum group-transition metal periodic structure alloy film; and for the recording film to include these and to be made of a plurality of recording layers of different materials or compositions. It is also possible to add elements such as Cr, Al, Ti, Pt, or Nb to the above magnetic layers in order to improve the corrosion resistance.

In the configuration described above, Ho was added at 5 mol % or more with respect to the Tb, or as a means of providing more preferable column width, from 20 mol % to 30 mol %, but equivalent effects can be attained as long as a material that induces the structure is added to another film in order to enlarge its structural units in columns.

Further, in the embodiments, as a film composition of the recording film obtained by layering a reproduction layer, a control layer, an intermediate isolating layer, and a recording layer, for example, the example provided above was for a reproduction layer 30 nm to 40 nm thick, a control layer and an intermediate isolating layer each 5 nm to 15 nm thick, and a thin film recording layer from 60 nm to 120 nm thick, but there is no limitation to these film thicknesses, and in order to attain the features of the present invention it is only necessary to obtain a sufficient magnetic coupling force between the recording layer and the reproduction layer and for the film thickness to be within a range of 5 nm to 200 nm, and more preferably, an equivalent effect can be obtained by setting the reproduction layer from 10 nm to 100 nm, the control layer from 5 nm to 50 nm, the intermediate isolating layer from 5 nm to 50 nm, and the recording layer from 30 nm to 200 nm.

It is further possible to adopt a configuration that employs a record assist layer or a transfer control layer, for example, or other magnetic films for improving the recording/reproducing properties. It is also possible to provide a multilayer magnetic film whose composition or magnetic domain wall energy density is varied in the film thickness direction as the intermediate isolating layer.

It is also possible to employ a method that permits tiny magnetic domains to be detected, such as using a short wavelength, high N.A. optical head or a GMR magnetic head, in order to detect recording signals, and by doing so equivalent effects can be obtained, whether in the case of single recording layer having the above columnar structural units or a multilayer film structure that does not employ magnetic super resolution or magnetic domain enlargement through magnetic domain wall movement.

The present embodiment was described regarding a configuration in which a reproduction layer, an intermediate layer, and a recording layer are layered in that order on a substrate with a dielectric layer between them and the substrate, and in which recording and reproduction are carried out via the disk substrate, but it is also possible to use a film configuration in which a recording layer, an intermediate layer, and a reproduction layer are layered on a substrate in that order in the opposite direction and to reproduce signals from the film surface side of the magneto-optical disk. In this case, effects at least equivalent to those above can be obtained even if a method that employs a magnetic head such as a GMR head, an optical head that employs near-field light, or an optical head with a high N.A., or a method that combines these methods when recording and reproducing, is adopted.

The magnetic layers making up the various layers in the magneto-optical recording medium of the present invention can be fabricated as long as they are formed through magnetron sputtering using a target employing metal materials for each layer or an alloy target containing a mixture of necessary materials, and the Ar gas pressure during film formation is set to between 0.3 Pa and 6.0 Pa, for example. The magnetic films can be provided even if the rare-earth metal composition such as the Gd of the magnetic films that are formed is altered due to factors related to the film formation conditions, such as the gas pressure when using Ar, Kr, Xe, or Ne gases, the magnetic field from the bias voltage or the cathode, for example, or the type of sputtering gas, for example, during film fabrication in the manufacturing process, as well as factors related to the device that is used. For example, if the percent of Gd in the GdFeCo varies within a range from 24% to 27%, then it is possible to adopt a method for forming the film by altering the Ar gas pressure during film formation from 1.2 Pa to 0.4 Pa, for example.

It is further possible to fabricate the magnetic films by controlling the film formation device conditions, even if using a film formation method in which periodic layers are formed through multi-target sputtering, such as revolving or stationary opposition type sputtering is adopted. In this case, as long as the columnar structural units of the recording layer are made large and the coercive force Hc and the vertical magnetic anisotropy Ku are increased, then it is possible to reliably transfer the signals of the recording layer to the reproduction layer, and when reproducing, to smoothly move the magnetic domain walls so that reproduction by enlarging the magnetic domains can be carried out stably.

Furthermore, the configuration described above was one in which an overcoat layer was formed directly on the dielectric layer above the recording layer, but it is also possible to adopt a configuration in which a thermal absorption layer is further disposed directly on the recording layer or with the dielectric layer therebetween. Examples of materials for the absorption layer are alloy materials including at least one of AlTi, Al, Cu, Ag, or Au, and it is only necessary that the material has greater thermal conductivity than that of the recording film.

In the configuration described above, the overcoat layer (protective layer) was formed from an epoxy acrylate-based resin or a urethane-based resin, but it is also possible to adopt other UV curable resins, thermosetting resins, resin materials containing lubricant, or structures in which another substrate is adhered using a hot-melt adhesive or the like.

The above description was made regarding a magneto-optical recording medium with which DWDD is used and methods for reproducing the same, but as long as a recording/reproducing method for obtaining high signal quality and high recording density is used, even if that method it is another magnetic domain expansion and reproduction method that employs magnetic domain wall movement, a method for expanding and reproducing reproduction magnetic domains through a shrinking operation, or a reproduction method employing a reproduction alternating magnetic field, and the recording layer is provided with a columnar structure, then there is excellent stability of tiny magnetic domains of 0.1 µm or less and stable recording and reproduction at high density is possible when transferring to and reproducing the reproduction layer as well, and effects equal to or better than those discussed above can be obtained.

Industrial Applicability

As recited above, with the present invention, the recording layer, to which recording information can be rewritten, in a magneto-optical recording medium with which the recording density and the transfer speed are significantly increased by adopting a magnetic domain wall movement type expansion and reproduction method that utilizes temperature gradients in the recording film is provided with a columnar structure in which there are columns in the direction vertical to the film surface, and thus it is possible to provide stable recording magnetic domains even if recording at high density and reproduction signals can be expanded through the stable movement of transferred magnetic domains with DWDD.

Moreover, by setting the width of the structural units of the columnar structure of the recording layer to between 2 nm and 40 nm and setting the thickness of the film to at least 40 nm, it is possible to achieve a magneto-optical recording medium with which the repeated recording and reproduction of recording information can be carried out favorably.

Furthermore, with the present invention, a configuration in which a recording layer having a columnar structure is formed is adopted, and thus even if films are formed through a stationary opposition film formation method in which an alloy target is employed, it is possible to provide a magneto-optical recording medium for DWDD with high quality even at short recording mark lengths.

Thus, with the present invention, it is possible to increase the resolution when reproducing high-density information signals recorded to the magneto-optical recording medium without being restricted by the optical diffraction limit.

It is also possible to provide a magneto-optical recording medium with high density and excellent signal properties with which the data transfer rate can be increased, the stability of the reproduction signal properties of magnetic domains transferred by DWDD is high due to the stabilized recording magnetic domains and the ability to transfer them to the reproduction layer, and moreover the signal amplitude can be increased. Furthermore, because the various margins are wider it is possible to carry out reproducing with less superimposed signals, and this allows the manufacturing costs for the magneto-optical recording medium and the costs for the recording/reproducing device to be reduced.

The invention claimed is:

1. A magneto-optical recording medium comprising:
   a recording film having at least a reproduction layer, an intermediate layer, and a recording layer, on an optical disk substrate;
   wherein the recording film is a magnetic film that is magnetically coupled and that has magnetic anisotropy in a direction vertical to its film surface;
   wherein recording magnetic domains formed in the recording layer are transferred to the reproduction layer, and recording information is reproduced by domain wall movement in the reproduction layer; and
   wherein the recording layer includes internal columnar structures oriented substantially vertically in relation to the recording film surface and having a width from 2 nm to 40 nm.

2. The magneto-optical recording medium according to claim 1, wherein the recording layer includes columns whose structural unit width is larger than that of to reproduction layer.

3. The magneto-optical recording medium according to claim 1, wherein the reproduction layer has an amorphous structure.

4. The magneto-optical recording medium according to claim 1, wherein the recording layer has a magnetic thin film density that is smaller than that of the reproduction layer.

5. The magneto-optical recording medium according to claim 1, wherein the recording layer and the reproduction layer include Ar atoms.

6. The magneto-optical recording medium according to claim 1, wherein the recording layer includes a porous structure.

7. The magneto-optical recording medium according to claim 1, wherein the recording layer has a magnetic thin film density from 2.0 g/cm$^3$ to 5.0 g/cm$^3$.

8. The magneto-optical recording medium according to claim 5, wherein the content of Ar atoms in the recording layer is greater than 0.5 mol %.

9. The magneto-optical recording medium according to claim 1, wherein a film thickness of the recording layer is from 40 nm to 300 nm.

10. The magneto-optical recording medium according to claim 1, wherein at border portions between adjacent tracks of a recording track region of the recording layer, the direction of the columnar structures of the recording film is slanted with respect to the direction vertical to the film surface.

11. The magneto-optical recording medium according to claim 1, wherein at least the intermediate layer includes columnar structures.

12. The magneto-optical recording medium according to claim 11, wherein a width of the columnar structures of the intermediate layer is from 2 nm to 40 nm and their thickness is from 5 nm to 80 nm.

13. The magneto-optical recording medium according to claim 1, further comprising:
   a control layer for inhibiting magnetic domain wall movement of at least the reproduction layer;
   wherein the control layer includes columnar structures.

14. The magneto-optical recording medium according to claim 13, wherein a width of the columnar structures of the control layer is from 2 nm to 40 nm and their thickness is from 5 nm to 80 nm.

15. The magneto-optical recording medium according to claim 1, wherein at least one of the recording layer and the intermediate layer is formed of an alloy thin film of a rare-earth metal and a transition metal.

16. The magneto-optical recording medium according to claim 15, wherein the rare-earth metal includes at least Th, Gd, Dy, and Ho.

17. The magneto-optical recording medium according to claim 1, wherein the reproduction layer is a fine amorphous layer with random atomic order.

18. The magneto-optical recording medium according to claim 1, wherein the reproduction layer has an amorphous structure of less than 2 nm.

19. The magneto-optical recording medium according to claim 1, wherein the reproduction layer has a smaller magnetic domain wall coercive force than that of the recording layer.

20. The magneto-optical recording medium according to claim 1, wherein the reproduction layer has a multilayer structure.

21. The magneto-optical recording medium according to claim 20, wherein the reproduction layer is made of a multilayer structure with different Curie temperatures or compensation composition temperatures.

22. The magneto-optical recording medium according to claim 1, wherein in at least the reproduction layer or the recording layer, magnetization is isolated by land portions formed between groove portions of the optical disk substrate or slanted portions between grooves, and recording magnetic domains formed in the recording layer are transferred to the reproduction layer from the groove portions of the optical disk substrate and recording information is reproduced by domain wall movement in the reproduction layer.

23. The magneto-optical recording medium according to claim 22, wherein a width of the groove portions is from 0.2 µm to 0.8 µm, and a depth of the groove portions is in a range from $\lambda/20n$ to $\lambda/3n$.

24. The magneto-optical recording medium according to claim 22, wherein land surfaces whose shape is rectangular or an inverted V-shape and whose height is in a range from 20 nm to 80 nm are formed between the groove portions.

25. The magneto-optical recording medium according to claim 1, wherein coupling between the reproduction layer, the intermediate layer, and the recording layer is at least one form of coupling selected from exchange coupling and magnetostatic coupling.

* * * * *

UNITED STATES PATENT AND TRADEMARK OFFICE
CERTIFICATE OF CORRECTION

PATENT NO.       : 7,180,831 B2                                    Page 1 of 1
APPLICATION NO.  : 10/497273
DATED            : February 20, 2007
INVENTOR(S)      : Murakami et al.

It is certified that error appears in the above-identified patent and that said Letters Patent is hereby corrected as shown below:

Column 24, lines 11-12(claim 2): "of to reproduction" should read --of the reproduction--.
Column 24, line 62(claim 16): "Th" should read --Tb--.

Signed and Sealed this

Sixteenth Day of October, 2007

JON W. DUDAS
*Director of the United States Patent and Trademark Office*